US008142730B2

(12) United States Patent  
Smid et al.

(10) Patent No.: US 8,142,730 B2  
(45) Date of Patent: Mar. 27, 2012

(54) TWO-STAGE GRANULAR MOVING-BED APPARATUS

(75) Inventors: Jiri Smid, Prague (CZ); Yau-Pin Chyou, Taipei (TW); Shu-San Hsiau, Taoyuan County (TW); Chin-Ching Tzeng, Taoyuan County (TW); Chia-Ren Hsu, Yunlin County (TW)

(73) Assignee: Institute of Nuclear Energy Research Atomic Energy Council, Executive Yuan, Taoyuan County (TW)

( * ) Notice: Subject to any disclaimer, the term of this patent is extended or adjusted under 35 U.S.C. 154(b) by 191 days.

(21) Appl. No.: 12/500,994

(22) Filed: Jul. 10, 2009

(65) Prior Publication Data

US 2010/0104487 A1    Apr. 29, 2010

(30) Foreign Application Priority Data

Oct. 28, 2008    (TW) ................................ 97141320 A

(51) Int. Cl.  
*B01J 8/08* (2006.01)

(52) U.S. Cl. ........ 422/216; 422/171; 422/176; 210/268; 34/171; 96/150

(58) Field of Classification Search .................. 422/216, 422/176, 171; 210/268; 34/171; 96/150  
See application file for complete search history.

(56) References Cited

U.S. PATENT DOCUMENTS

| | | | | |
|---|---|---|---|---|
| 3,926,587 A | * | 12/1975 | Squires | .............................. 95/74 |
| 3,926,593 A | * | 12/1975 | Squires et al. | ................... 95/276 |
| 3,928,532 A | * | 12/1975 | Squires | .......................... 423/210 |
| 3,957,953 A | * | 5/1976 | Squires | ..................... 423/244.02 |
| 3,981,355 A | * | 9/1976 | Squires | ..................... 165/104.16 |
| 3,982,326 A | * | 9/1976 | Squires | ............................ 34/443 |
| 3,987,148 A | * | 10/1976 | Squires | ..................... 423/243.08 |
| 4,000,066 A | * | 12/1976 | Squires | .......................... 210/678 |
| 4,004,350 A | * | 1/1977 | Squires | ............................ 34/506 |
| 4,004,897 A | * | 1/1977 | Squires | ............................ 95/276 |

(Continued)

FOREIGN PATENT DOCUMENTS

DE            3817685        12/1989

(Continued)

OTHER PUBLICATIONS

Quantitative Design of Mass-Flow Bins A.W.Jenike (Jenike & Johanson,Inc.,Winchester,Mass (U.S.A) (received Sep. 13, 1967).  
Gravity Flow of Solids by Prof.Andrew W. Jenike ,Ph.D. Trans.Instn Chem.Engrs.vol. 40,1962.

*Primary Examiner* — Walter D Griffin  
*Assistant Examiner* — Huy-Tram Nguyen  
(74) *Attorney, Agent, or Firm* — WPAT, PC; Justin King

(57) ABSTRACT

A two-stage granular moving-bed filter includes a gas inlet part, a gas outlet part, and a plurality of flow-corrective elements. The gas outlet part is disposed opposite to the gas inlet part, and the plurality of flow-corrective elements is disposed in a channel formed between the gas inlet part and gas outlet part. Meanwhile, a first granular material is provided to flow through a channel formed between the gas inlet part and the flow-corrective element in a state of mass flow, and a second granular material is provided to flow through a channel formed between the flow-corrective element and the gas outlet part. By means of having two different kinds of filter media moving through the channels between the gas inlet and outlet part, it is capable of performing two-stage filtering process after the raw gas flows therethrough, so as to improve the filtering effect of the gas.

27 Claims, 18 Drawing Sheets

U.S. PATENT DOCUMENTS

| | | | |
|---|---|---|---|
| 4,333,751 A | 6/1982 | Iwamura et al. | |
| 7,132,088 B2 * | 11/2006 | Smid et al. | 422/176 |
| 2004/0076556 A1 * | 4/2004 | Smid et al. | 422/171 |
| 2010/0247393 A1 * | 9/2010 | Chyou et al. | 422/142 |

FOREIGN PATENT DOCUMENTS

| | | |
|---|---|---|
| DE | 3830618 | 3/1990 |
| DE | 4030896 | 4/1992 |

* cited by examiner

TWO-STAGE GRANULAR MOVING-BED APPARATUS

BACKGROUND OF THE INVENTION

1. Field of Invention

The present invention relates to a granular moving-bed apparatus, and more particularly to a two-stage granular moving-bed filter utilizing different kinds of granular filter media to clean up gas.

2. Related Art

Coal-fired power plants, or metallurgical processes and incineration plants generate high-temperature gas containing a large amount of fly ashes and dusts, sulfides, nitrides or other contaminants, and if the exhaust flue gas or raw syn-gas is emitted without processing, the environment of mankind will be affected seriously. In order to solve the environmental pollution problems due to hazardous gases, industrial countries have to constitute strict emission standards, and also input considerable research and development (R&D) resources to investigate how to remove the harmful pollutants in the gas streams effectively so as to conform to the emission standards.

In prior art, many methods of gas cleanup exist, among which some methods are common, namely mechanical separation of dust in cyclones, electrostatic dust collecting, baghouse filters, ceramic candle filters, granular moving-bed filters, etc. Cyclones are considered to be powerful and cheap pre-separators for gas cleanup purposes. Their removal efficiency is, however, limited to about 90% and rapidly deteriorates for particles smaller than 10 microns.

In the most widely used electrostatic dust precipitators, corona is utilized to ionize the exhaust gas so as to make the harmful materials carrying negative charges, and these materials are then caught on earthed collector plates to achieve the objective of gas cleanup. Electrostatic precipitators can be operated economically in flue gases of large volumes, but their efficiency is influenced by effects of chemical composition of particles, particle electric resistivity, moisture content, and temperature of gas.

Furthermore, another baghouse filter dust collecting technique also achieves the effect of gas cleanup through retaining the harmful materials in the exhaust gas, passing through the baghouse filter fabric. The baghouse filters offer very high dust collection efficiency and, operating in low temperature, they have the advantage over electrostatic dust precipitators, that the electric resistivity of dust particles does not play any role, making them competitive for high-resistivity ashes. Particles of different size are removed by different physical mechanisms in baghouse filters. The highest removal efficiencies are obtained for the large particles at high gas velocities and for the finest particles at low velocities. Baghouse filters can work at higher temperatures, depending on fabric materials. Ceramic materials, usually based on alumina, quartz or aluminum silicates are the best choice. A disadvantage when compared with electrostatic dust precipitators is the larger pressure drop and relatively low gas face velocity. Low gas face velocity gives rise to large filtration surface and inherently high costs.

Ceramic candle filters have been and are still being tested at full scale operation at several IGCC demonstration projects. Filter cleaning is done by backpulsing usually with nitrogen. Typical problems encountered during the testing are the breakage and strength degradation of ceramic candles owing to the overheating, thermal shocks and excessive pressure drop. In addition, the plenum vibration and back-pulse cleaning expose the candle filters to thermal and mechanical fatigue stresses that may ultimately lead to fracture of the filter elements.

Granular moving-bed filters are very well suitable for high temperature gas filtration. They are developed as key subsystems of current integrated gasification combined cycle (IGCC) and advanced pressurized fluidized bed combustion (PFBC) power generation systems. Their potential economic advantage is based on the fact that the granular moving bed filters may be more compact than either electrostatic precipitators or baghouse filters. The principal disadvantage of these filters is that either a very thick bed or very fine granular material (or both) are required to give high removal efficiency of particulates in the 0.5 to 10 microns size range. The requirement for thick beds results in large expensive equipment, while the use of very fine granular material causes high pressure drop, poor bed flow characteristics, accompanied by stagnant zones and hot spots in granular moving bed, causing corrosion and plaques on louver wall. Flow patterns in moving bed are influenced by friction of filter media on louver walls. It results in uprise of stagnant zones alongside louver walls. Besides particulate removal, granular moving beds may be able to capture other contaminants through the use of other materials (such as sorbent, activated carbon, etc.), in two stage process, but in one apparatus.

In order to improve the removal efficiency of granular moving bed filters, and extend the options in which the granular filter media can be applied, the technologically developed countries are devoted to research and development of environmental-friendly gas cleanup technologies, and so far, the granular moving-bed filter is a highly regarded gas cleanup apparatus, and can be considered as the exhaust gas cleanup apparatus widely used in the future. FIG. 1 is a schematic view of a common granular moving-bed filter. Referring to FIG. 1, the granular moving-bed filter is constituted by a plurality of hopper-shaped structures 16, and each hopper-shaped structure 16 has louver walls 10 and 11 at two sides thereof. The granular material, serving as the filter medium, enters from the top of the granular moving-bed, so that the granular material 15 goes down along the hopper-shaped structure 16 to clean up the harmful substances in the exhaust gas stream passing through the granular material, and the granular material which has adsorbed impurity or lost filtering effect exits from the bottom of the granular moving-bed. In FIG. 1, the raw syn-gas or exhaust gas flow 90 enters the granular moving-bed from the louver wall 10 at inlet side of the granular moving-bed, and passes through the filter medium 15. The harmful or polluting material contained in the exhaust gas flow 90 is filtered out by the filter medium 15, and the clean gas flow 91 exits from the louver wall 11 at the outlet side of the granular moving-bed. FIG. 2 is a schematic view of the granular moving-bed filter generating stagnant zones. Similarly, the exhaust gas flow 90 enters the granular moving-bed via the louver wall 10, and the clean gas flow 91 exits the louver wall 11. However, in the prior art, when flowing in the flow path, the granular material 15 generates kinematic friction with the louver walls 10 and 11, so that the granular flow generates a central fast-flowing zone 12, a quasi-stagnant zone 13, and a stagnant zone 14 in the flow path. When the stagnant zones are formed alongside the louver walls 10 and 11, because the granules are not moving, the dust filtered will deposit, and gradually plug the exhaust gas flow 90 from flowing through, thereby affecting the efficiency of filtering and generating the clean gas flow 91. As the same stagnant zone uprises on louver wall 11, the gas pressure drop in moving bed increases, resulting in an unacceptable value of pressure drop across the filter.

For example, in the prior art, U.S. Pat. No. 7,132,088 discloses a granular moving-bed apparatus, which utilizes filter medium flowing in granular moving-bed with internal saddle-roof-shaped flow-corrective elements, so that the granular flow is divided into two streams, characterized by mass flow without stagnant zones, and the problems of the corrosion of the louver walls or stagnant zones in the prior art can be solved by this mass flow design.

Furthermore, DE4030896 discloses a granular moving-bed filter, which utilizes two different moving-beds divided by a hardware structure to clean up exhaust gas. However, the path of the exhaust gas in moving bed is long and changing arrangement of flow from counter-current to co-current or vice versa, and thus the pressure drop of the exhaust gas is high, thereby energy-intensive and affecting the flow rate of the gas. Additionally, DE3817685 discloses a granular moving bed apparatus, which also utilizes two streams of different granular media kept apart by a perforated vertical wall to uniformly distribute and clean up the exhaust gas. In the technique, because the perforated vertical wall, separating the two streams of granules, may be plugged by dust coming with flue gas or by dust from abrasion of granular media. Thus the flow of flue gas through perforated vertical wall is obstructed. In addition, the exhaust gas flow also gives rise to pinning of granular media to the perforated vertical wall. Pinning of granules hampers their smooth sliding along the wall. Also, the exhaust gas flow can create some cavities on the vertical perforated wall which disturb flow of granules and decrease their filter efficiency.

SUMMARY OF THE INVENTION

The present invention provides a two-stage granular moving-bed apparatus, which utilizes two filter media with different purposes and objectives to flow through channels in the moving bed apparatus in a state of continuous mass flow without stagnant zones, so that the contaminant in the gas entering the moving bed apparatus may be filtered out by forcing gas through the two different filter media which carry contaminant away, thereby increasing the effect of filtration.

The present invention provides a two-stage granular moving-bed apparatus, which is capable of cleaning up gas by two different filter media. One filter media may be a filter media with large size granules to clean up the dust particles in the gas, and the other filter media may be a filter media with small size granules or an adsorbent to clean up sulfide, carbon dioxide, or other contaminants in the gas.

In an embodiment, the present invention provides a two-stage granular moving-bed apparatus, which includes a filtering part, a filter media supplying part, a first granular material, and a second granular material. The filtering part includes a gas inlet part, a gas outlet part, and a plurality of flow-corrective elements. The gas inlet part has a plurality of first louver walls, for an exhaust gas flow to enter the filter. The gas outlet part is disposed at one side of the gas inlet part, and has a plurality of second louver walls corresponding to the plurality of first louver walls respectively, for a clean gas to flow out. The plurality of flow-corrective elements is disposed between the gas inlet part and the gas outlet part, and each flow-corrective element is corresponding to the first louver wall and the second louver wall. The filter media supplying part is disposed above the filtering part, and is divided into a first accommodation space and a second accommodation space by a partition board. The first granular material is accommodated in the first accommodation space, and flows through a channel between the flow-corrective element and the first louver wall in a state of mass flow. The second granular material is accommodated in the second accommodation space, and flows through a channel between the flow-corrective element and the second louver wall in a state of mass flow. The first granular material and the second granular material may remove the contaminants in the exhaust gas flow to form a clean gas flow.

In another embodiment, the present invention provides a two-stage granular moving-bed apparatus, which includes a filtering part, a filter media supplying part, a first granular material, and a second granular material. The filtering part includes an annular gas inlet part, an annular gas outlet part, and a plurality of annular frustoconical flow-corrective elements. The annular gas inlet part has a plurality of first annular frustoconical downwardly orientated louver walls for an exhaust gas flow to enter the filter. The annular gas outlet part forms internal boundary of annular moving bed and has a plurality of second annular frustoconical upwardly orientated louver walls corresponding to the plurality of first annular frustoconical downwardly orientated louver walls respectively for a clean gas flow to leave the filter. The plurality of annular frustoconical flow-corrective elements is disposed between the annular frustoconical downwardly orientated gas inlet part and the annular frustoconical upwardly orientated gas outlet part, and each annular frustoconical flow-corrective element is corresponding to the first annular frustoconical downwardly orientated louver wall and the second annular frustoconical upwardly orientated louver wall. The filter media supplying part is disposed above the filtering part, and is divided into a first annular accommodation space and a second annular accommodation space by a cylindrical partition board. The first granular material is accommodated in the first annular accommodation space, and flows through an annular channel between the annular frustoconical flow-corrective element and the first annular frustoconical downwardly orientated louver wall in a state of mass flow. The second granular material is accommodated in the second annular accommodation space, and flows through an annular channel between the annular frustoconical flow-corrective element and the second annular frustoconical upwardly orientated louver wall in a state of mass flow. The first granular material and the second granular material may remove the contaminants in the exhaust gas flow to form the clean gas flow.

In another embodiment, the present invention provides a two-stage granular moving-bed apparatus which includes a filtering part, a filter media supplying part, a first granular material, and a second granular material. The filtering part includes an annular gas inlet part, an annular gas outlet part, and a plurality of annular frustoconical flow-corrective elements. The annular gas inlet part has a plurality of first annular frustoconical upwardly orientated louver walls, for an exhaust gas flow to enter the filter. The annular gas outlet part forms the outer boundary of annular moving bed and has a plurality of second annular frustoconical downwardly orientated louver walls corresponding to the plurality of first annular frustoconical upwardly orientated louver walls respectively, for a clean gas flow to leave the filter. The plurality of annular frustoconical flow-corrective elements is disposed between the annular frustoconical upwardly orientated gas inlet part and the annular frustoconical downwardly orientated gas outlet part, and each annular frustoconical flow-corrective element is corresponding to the first annular frustoconical upwardly orientated louver wall and the second annular frustoconical downwardly orientated louver wall. The filter media supplying part is disposed above the filtering part, and is divided into a first annular accommodation space and a second annular accommodation space by a cylindrical partition board. The first granular material is accommodated in the first annular accommodation space, and flows through an annular channel between the annular frustoconical flow-corrective element and the first annular frustoconical upwardly orientated louver wall in a state of mass flow. The second granular material is accommodated in the second annular accommodation space, and flows through an annular channel between the annular frustoconical flow-corrective element and the second annular frustoconical downwardly orientated louver wall in a state of mass flow. The first granular material and the second granular material may remove the contaminants in the exhaust gas flow to form the clean gas flow.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
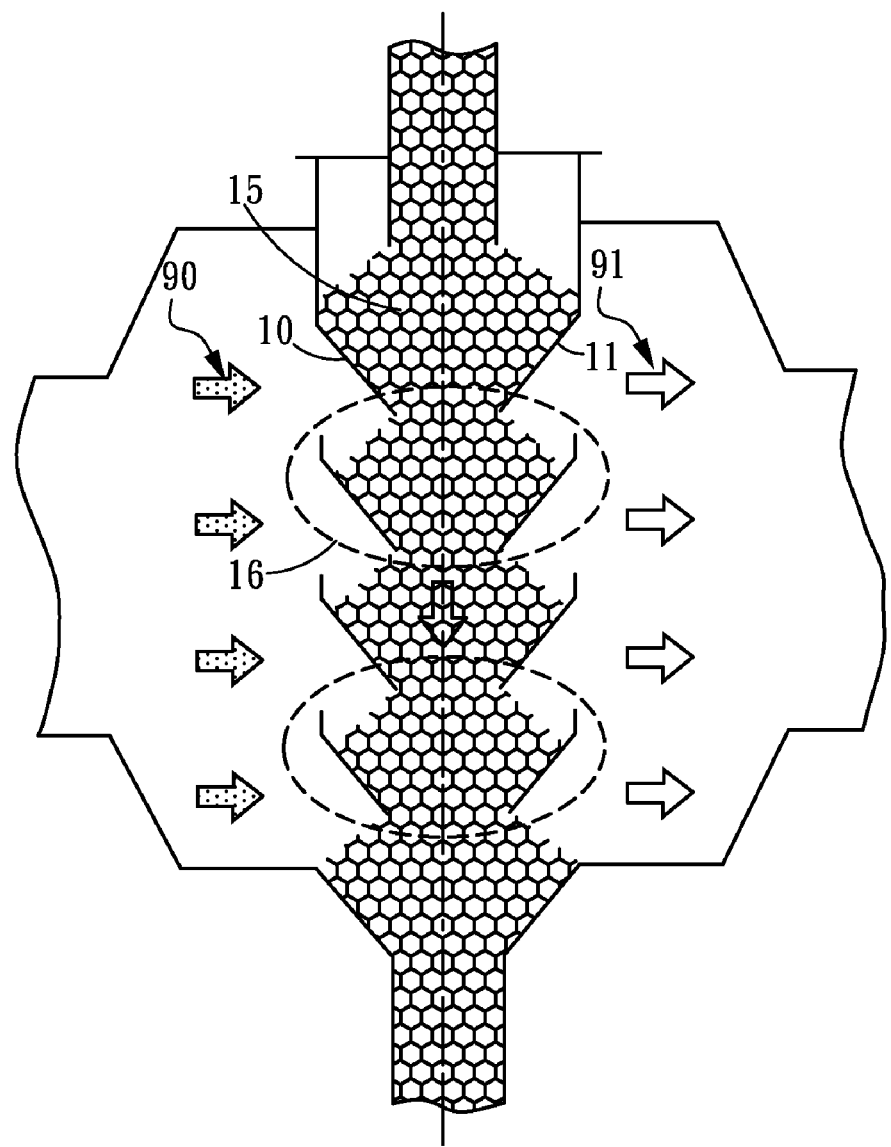
FIG. 1 is a schematic view of a conventional granular moving-bed apparatus with louver walls.
Figure 2:
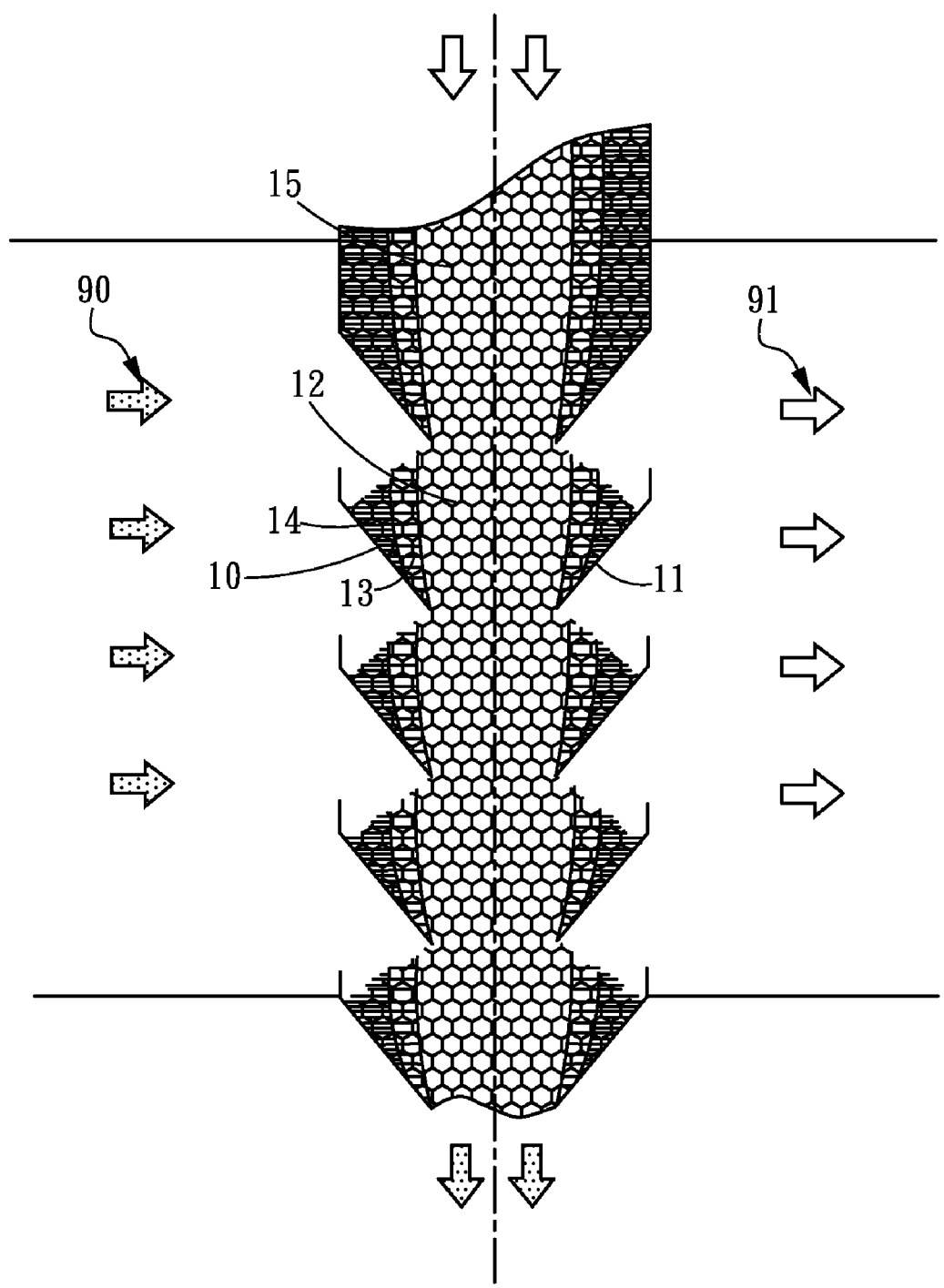
FIG. 2 is a schematic view of a conventional granular moving-bed apparatus generating stagnant zones during granular flow.
Figure 3A:
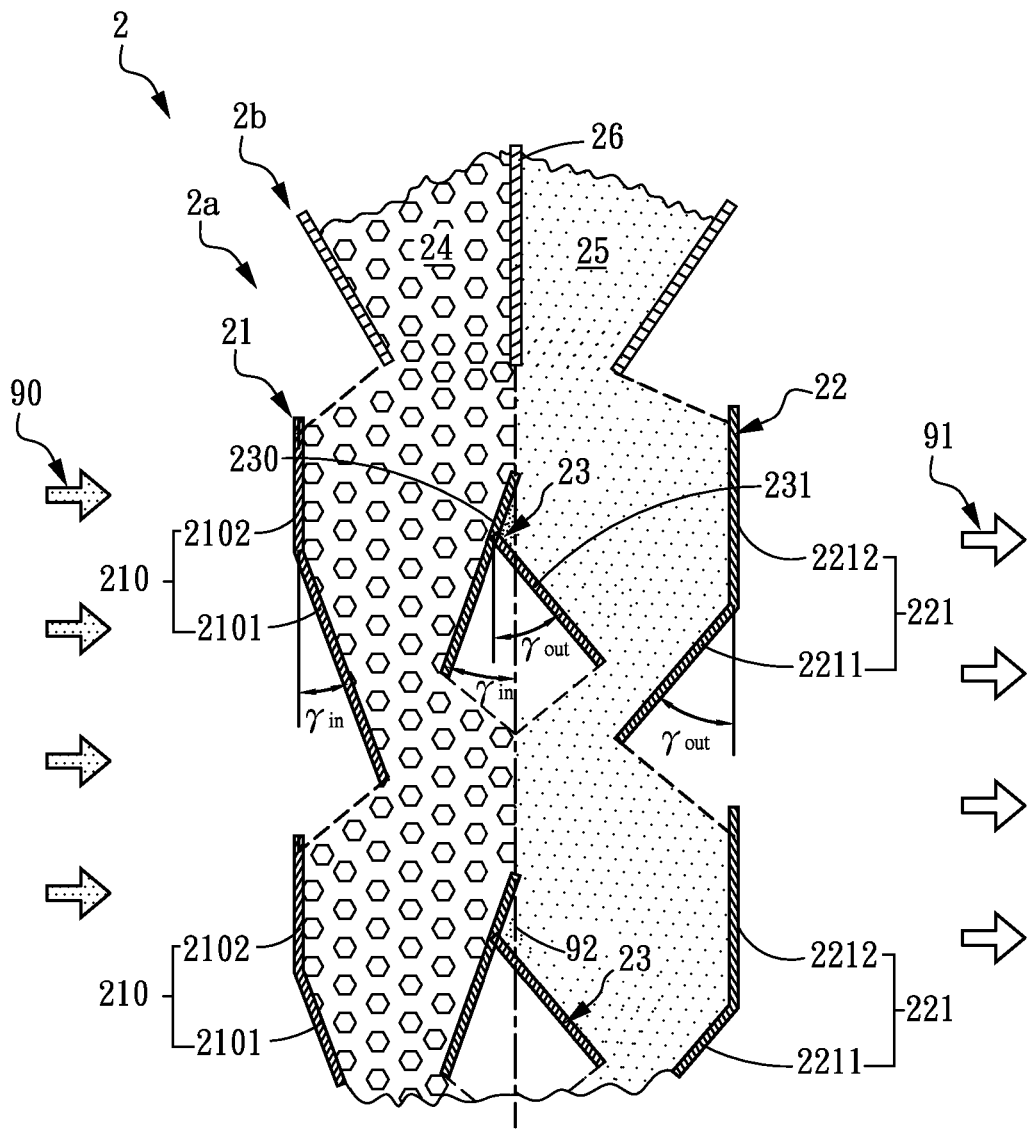
FIG. 3A is a schematic sectional view of a two-stage granular moving-bed apparatus according to a first embodiment of the present invention.

In order to make the review committeeman further recognize and understand the features, objectives and functions, illustration below is made about the related detailed structure and the design concept of the apparatus of the present invention below to make the review committeeman understand the characteristics of the present invention, the detailed illustration is as below:

FIG. 3A is a schematic sectional view of a two-stage granular moving-bed apparatus according to a first embodiment of the present invention. Referring to FIG. 3A, the two-stage granular moving-bed apparatus 2 includes a filtering part 2a and a filter media supplying part 2b. The filtering part 2a has a gas inlet part 21, a gas outlet part 22, and a plurality of flow-corrective elements 23. The gas inlet part 21 has a plurality of first louver walls 210, and is provided for an exhaust gas flow 90 to flow therethrough. The exhaust gas flow 90 has dust particles and contaminants such as nitric oxides, sulfides ($H_2S$ or $SO_x$), ammonia, alkali, or hydrogen chloride. The first louver wall 210 further has a first guide plate 2101 (inclined guide plate) and a second guide plate 2102 (vertical guide plate). One end of the second guide plate 2102 is connected to one end of the first guide plate 2101. The gas outlet part 22 is disposed at one side of the gas inlet part 21 and has a plurality of second louver walls 221, and each second louver wall 221 is corresponding to each of the plurality of first louver walls 210 respectively. The second louver wall 221 has a third guide plate 2211 (inclined guide plate) and a fourth guide plate 2212 (vertical guide plate), and one end of the third guide plate 2211 is connected to one end of the fourth guide plate 2212. In this embodiment, the first guide plate 2101 and the third guide plate 2211 are configured to incline, so that one end of the first louver wall 210 and the second louver wall 221 shrink to form a neck flow path. An angle $\gamma_{in}$ between the first guide plate 2101 and the vertical surface (the second guide plate 2102) is different from an angle $\gamma_{out}$ between the third guide plate 2211 and the vertical surface (the fourth guide plate 2212) and the angle $\gamma_{in}$ depends on flow properties of first granular material 24 and meets the requirements for mass flow of first granular material 24, and the angle $\gamma_{out}$ depends on flow properties of second granular material 25 and meets the requirements for mass flow of second granular material 25.

The plurality of flow-corrective elements 23 is disposed between the gas inlet part 21 and the gas outlet part 22, and each flow-corrective element 23 is corresponding to the first louver wall 210 and the second louver wall 221 at two sides thereof respectively. In this embodiment, each flow-corrective element 23 further has a first plate 230 and a second plate 231. An angle is formed between first plate 230 and the vertical plane 92 and between the second plate 231 and the vertical plane 92 respectively, and one end of the second plate 231 is connected to the body of the first plate 230. The angle between the first plate 230 and the vertical plane is the same as the angle $\gamma_{in}$ between the first guide plate 2101 and the vertical plane, and the angle between the second plate 231 and the vertical plane is the same as the angle $\gamma_{out}$ between the third guide plate 2211 and the vertical plane.

A channel between the gas inlet part 21 and the first plate 230 may be provided for a first granular material 24 to flow therethrough. A channel between the gas outlet part 22 and the second plate 231 may be provided for a second granular material 25 to flow therethrough. The first granular material 24 and the second granular material 25 both flow through the corresponding channels in a state of mass flow, and thus the cross-over will not occur on the boundary of the granular material 24 and the second granular material 25. Therefore, in the filtering part 2a, additional partition board is not required to separate the two kinds of granular materials 24 and 25, and gas flow 90 is forced through granular materials 24 and 25 in cross flow with low pressure drop. In this embodiment, the first granular material 24 is a coarse filter media, and the second granular material 25 is a fine filter media. The first granular material 24 or the second granular material 25 may be selected as silica sand or other minerals, ceramic particles, activated carbon, or adsorbent, so as to clean up dust particles or adsorb contaminants such as nitric oxides, sulfides ($H_2S$ or $SO_x$), ammonia, alkali, or hydrogen chloride. In addition, in another combination, the first granular material 24 may be selected as a filter media, and the second granular material 25 may be selected as an adsorbent or catalyst.

The filter media supplying part 2b is disposed above the filtering part 2a, and has a partition board 26 therein, to ensure separation of granular materials 24 and 25, so that two accommodation spaces are formed within the filter media supplying part 2b to provide the first granular material 24 and the second granular material 25 that can be discharged under the gravity. Generally speaking, in order to enable the filtering part 2a to have two kinds of granular filter media 24 and 25, at first, the two accommodation spaces accommodate the first granular material 24 at the same time. After the filtering part 2a is filled with the first granular material 24, the second granular material 25 is placed in one of the accommodation spaces of the filter media supplying part 2b, then beds of both granular filter media 24 and 25 begin to move and, under the effect of the gravity flow, a channel between the gas outlet part 22 and the flow-corrective element 23 is filled with the second granular material 25 after a period of time. When flowing into the flow path via the first louver wall 210 of the gas inlet part 21, the exhaust gas flow 90 flows through the first granular material 24 and the second granular material 25 between the gas inlet part 21 and the gas outlet part 22 in turn. Because the first granular material 24 and the second granular material 25 have an effect of filtration and adsorption, the contaminants in the exhaust gas flow, when the exhaust gas flow 91 flows through the second granular material 25 via the first granular material 24, the contaminants in the exhaust gas flow 90 will be filtered out, so that the exhaust gas flow 90 becomes the clean gas flow 91 and exits the gas outlet part via the second louver wall 221.

Figure 3B:
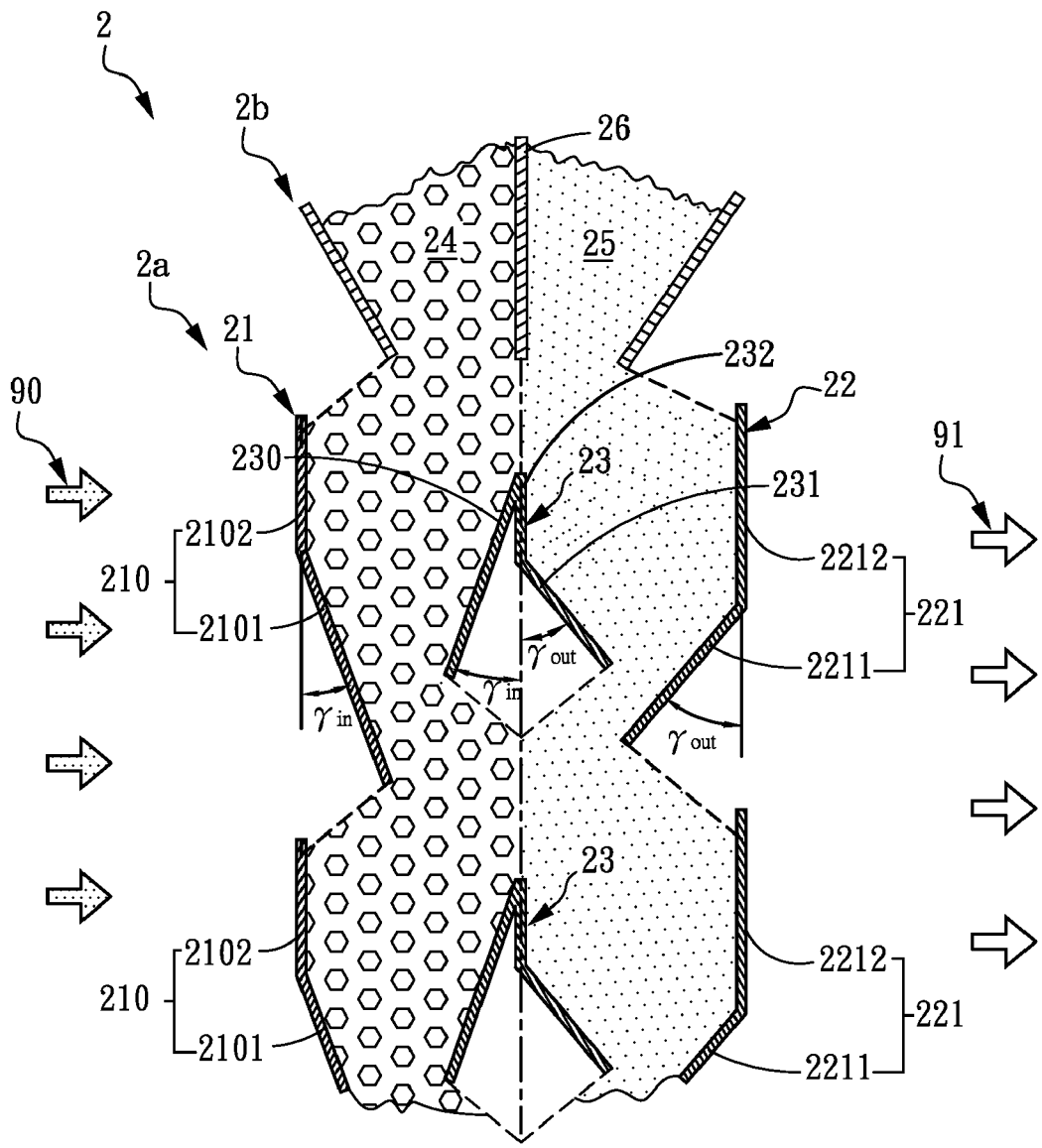
FIG. 3B is a schematic sectional view of a two-stage granular moving-bed apparatus according to a second embodiment of the present invention.
Figure 3C:
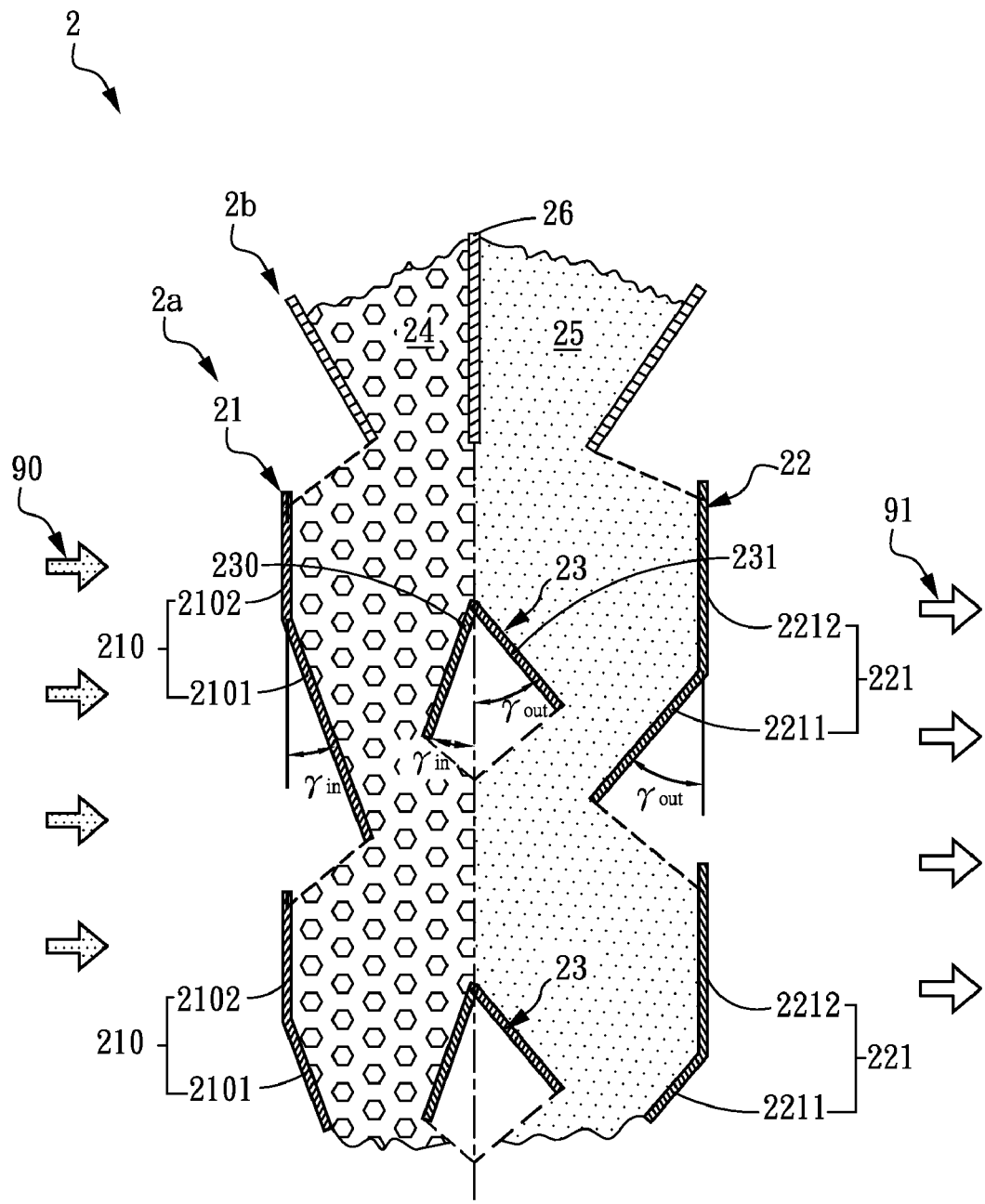
FIG. 3C is a schematic sectional view of a two-stage granular moving-bed apparatus according to a third embodiment of the present invention.
Figure 3D:
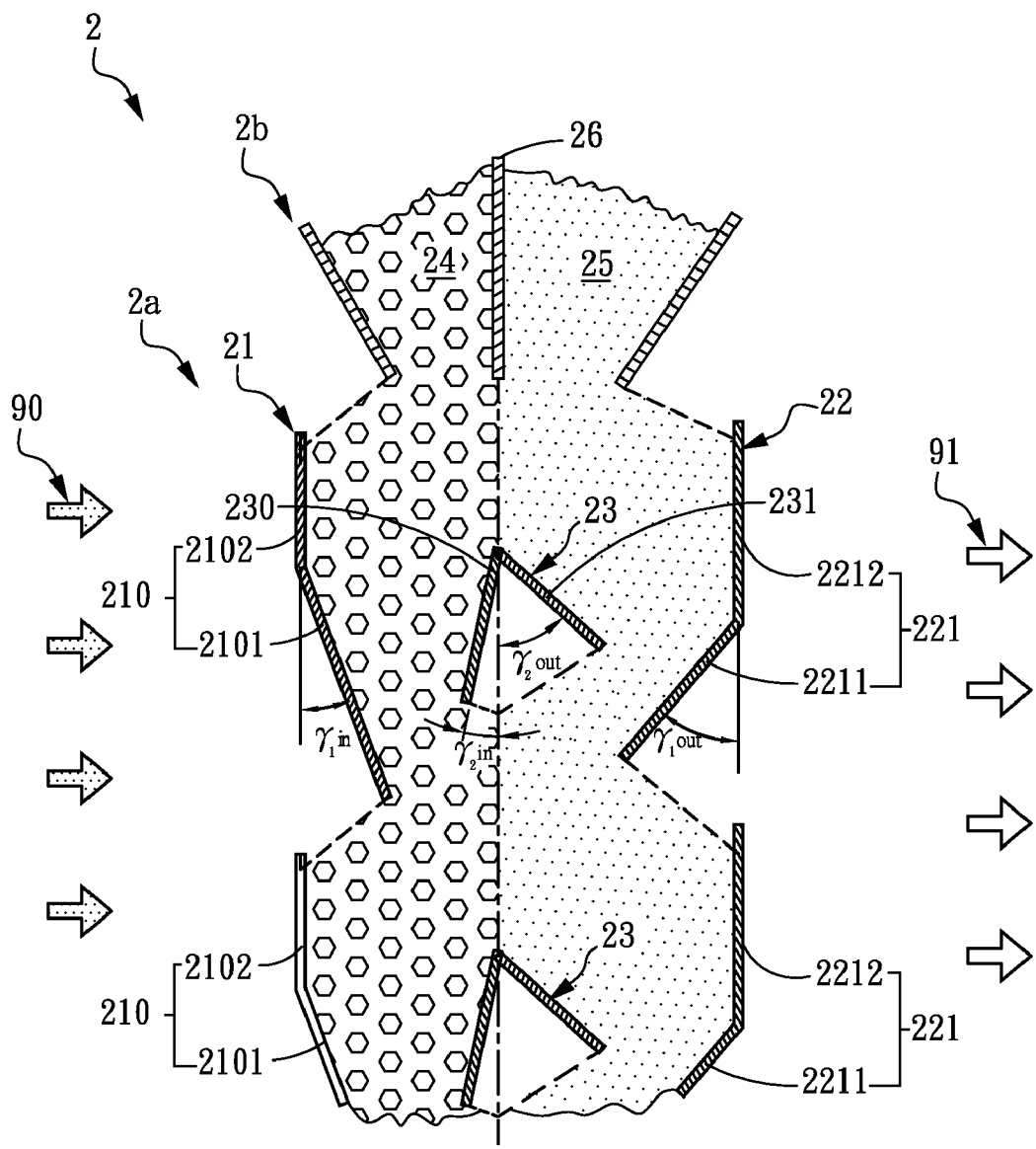
FIG. 3D is a schematic sectional view of a two-stage granular moving-bed apparatus according to a fourth embodiment of the present invention.

FIG. 3B is a schematic sectional view of a two-stage granular moving-bed apparatus according to a second embodiment of the present invention. Referring to FIG. 3B, this embodiment is substantially the same as that in FIG. 3A, only except that a third plate 232 is further connected between the first plate 230 and the second plate 231 of the flow-corrective element 23. FIG. 3C is a schematic sectional view of a two-stage granular moving-bed apparatus according to a third embodiment of the present invention. Referring to FIG. 3C, this embodiment is substantially the same as that in FIG. 3A, only except that one end of the first plate 230 of the flow-corrective element 23 is connected to one end of the second plate 231. Furthermore, FIG. 3D is a schematic sectional view of a two-stage granular moving-bed apparatus according to a fourth embodiment of the present invention. Referring to FIG. 3D, this embodiment is substantially the same as that in FIG. 3A, only except that an angle $\gamma_{2in}$ between the first plate 230 and the vertical plane is different from an angle $\gamma_{1in}$ between the first guide plate 2101 and the vertical plane, and an angle $\gamma_{2out}$ between the second plate 231 and the vertical plane is different from an angle $\gamma_{1out}$ between the third guide plate 2211 and the vertical plane.

Figure 4A:
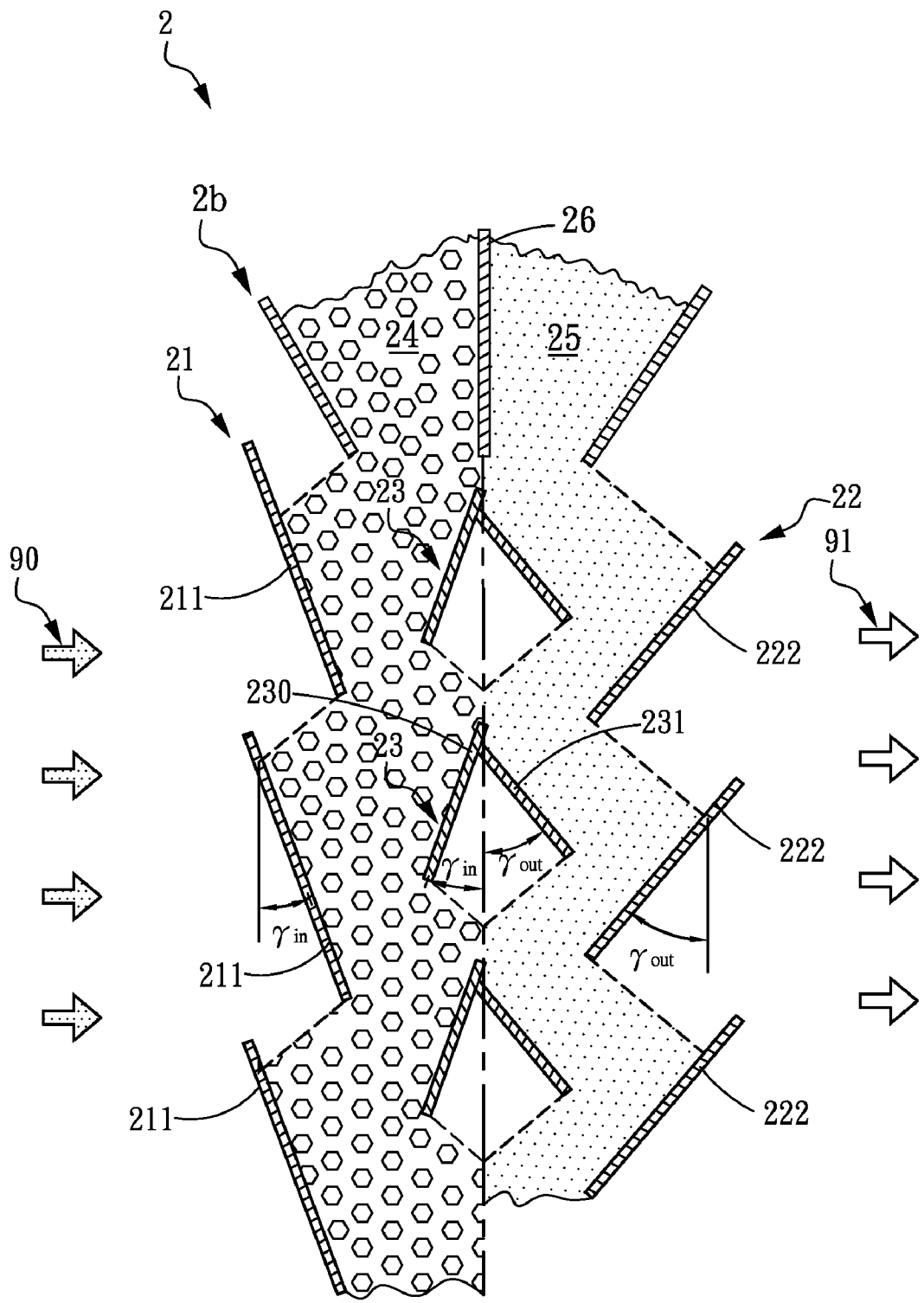
FIG. 4A is a schematic sectional view of a two-stage granular moving-bed apparatus according to a fifth embodiment of the present invention.
Figure 4B:
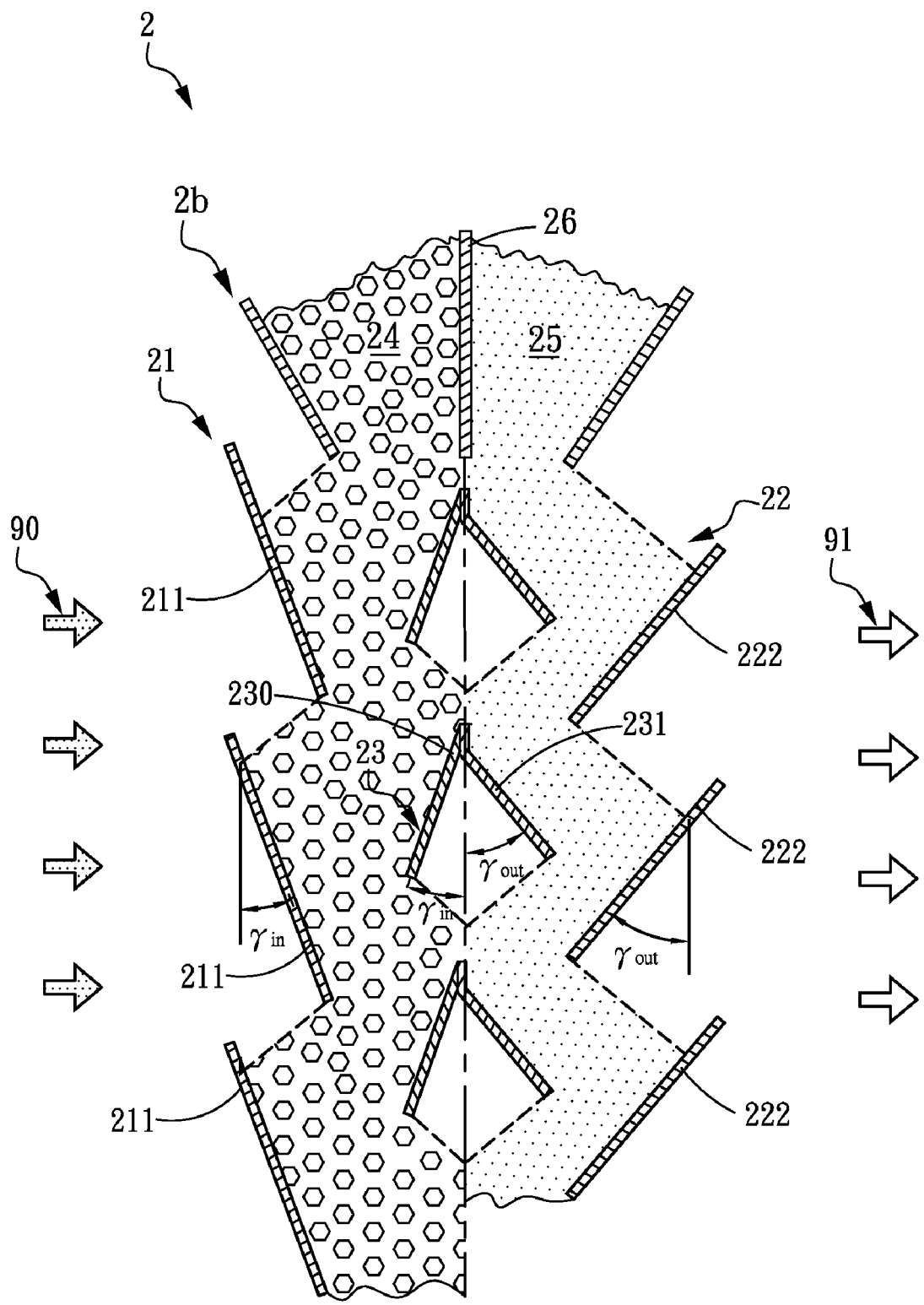
FIGS. 4B to 4D are schematic views of embodiments in which the louver walls in the embodiments of FIGS. 3B to 3D are replaced with slat louver walls.
Figure 4C:
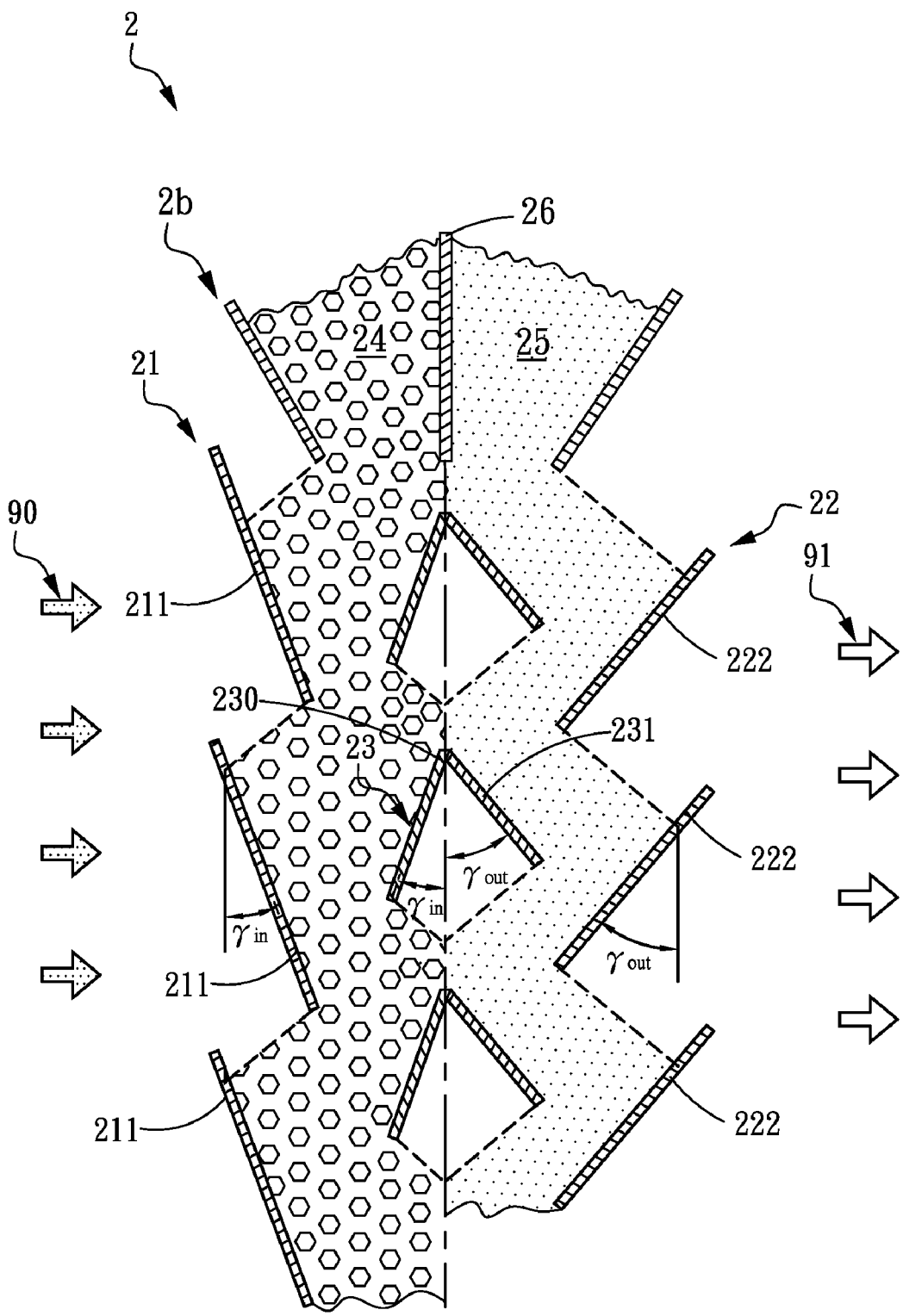
Figure 4D:
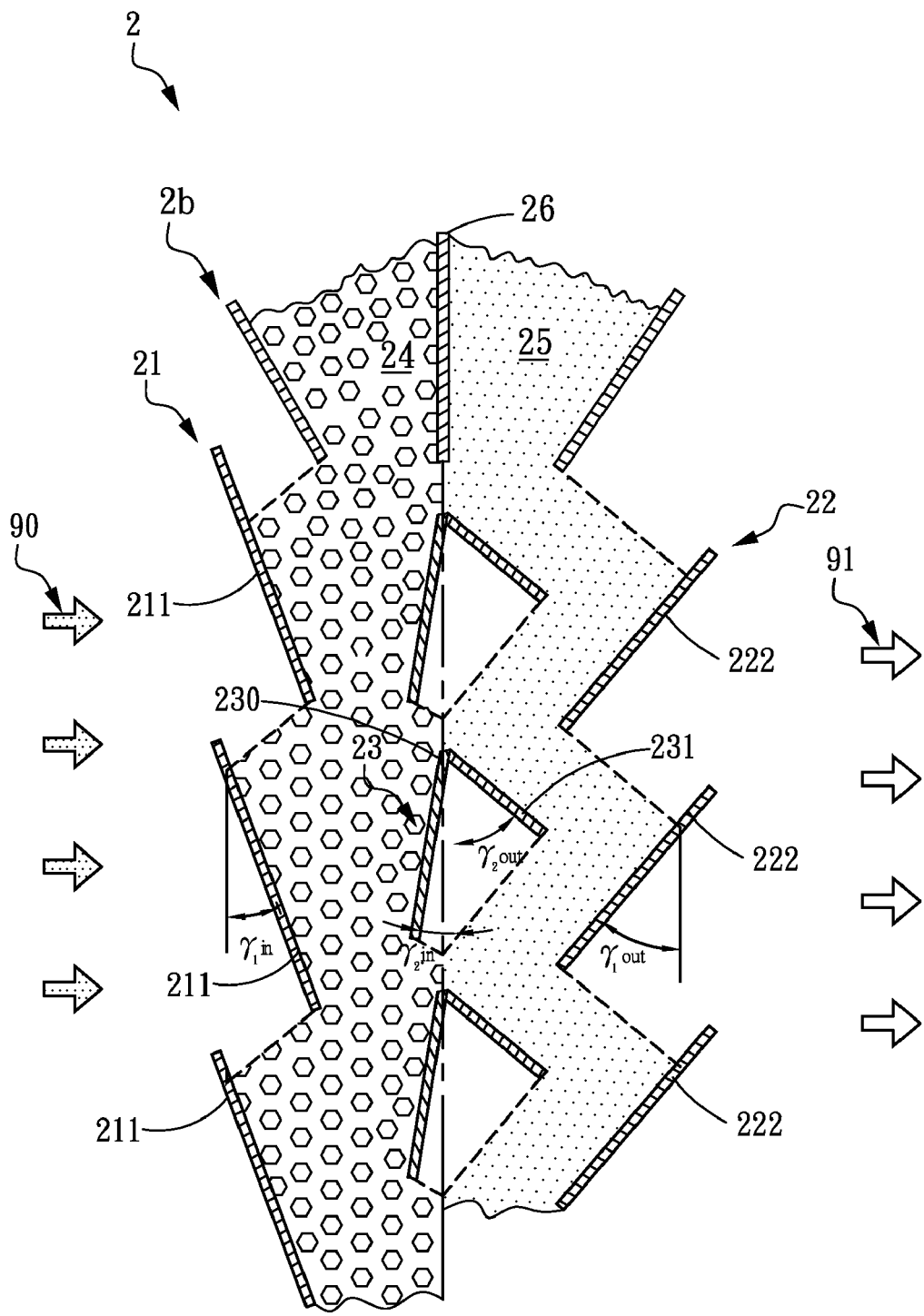

FIG. 4A is a schematic sectional view of a two-stage granular moving-bed apparatus according to a fifth embodiment of the present invention. Referring to FIG. 4A, this embodiment is substantially the same as the embodiment of FIG. 3A, only except that each of the first louver walls 211 is a slat guide plate and each of the second louver walls 222 is a slat guide plate. An angle $\gamma_{in}$ is formed between the first louver wall 211 and the vertical plane, and an inclined angle $\gamma_{out}$ is formed between the second louver wall 222 and the vertical plane. The angle between the first plate 230 and the vertical plane is the same as the angle $\gamma_{in}$ between the first louver wall 211 and the vertical plane, and the angle between the second plate 231 and the vertical plane is the same as the angle $\gamma_{out}$ between the second louver wall 222 and the vertical plane. For the same reason, the embodiments of FIGS. 4B to 4D correspond to FIGS. 3B to 3D respectively, only except that the first louver walls and the second louver walls of FIGS. 3B to 3D are replaced with the slat guide plates 221 and 222.

Figure 5:
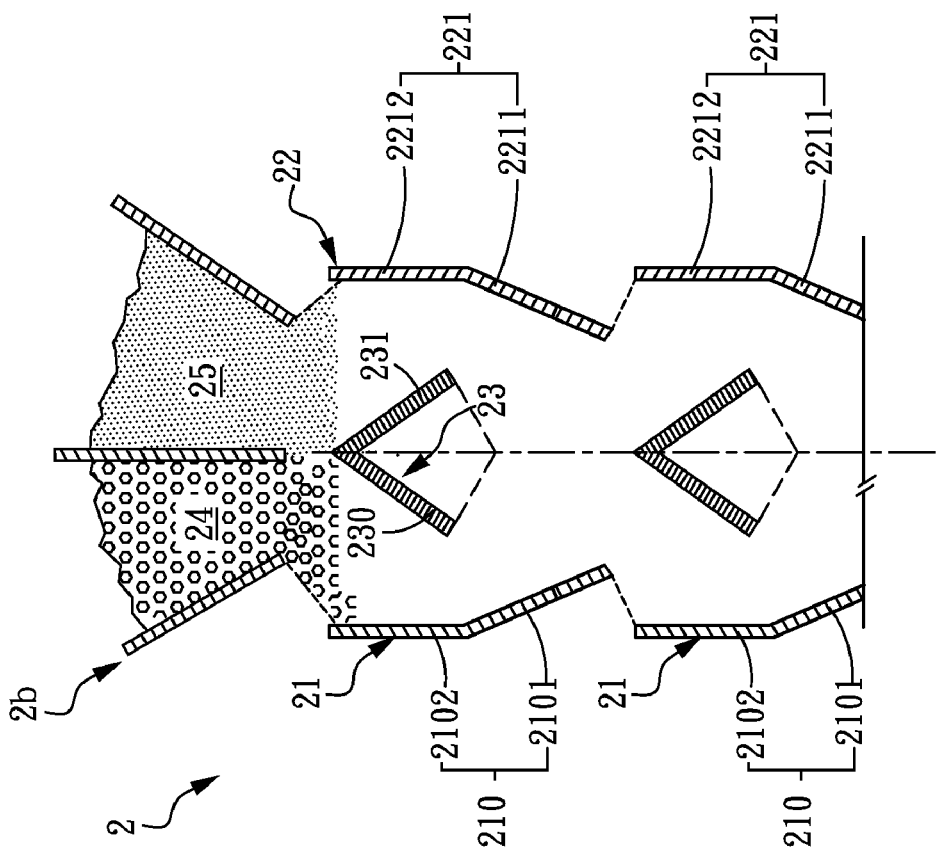
FIG. 5 is a schematic sectional view of a two-stage granular moving-bed apparatus according to a sixth embodiment of the present invention.
Figure 6:
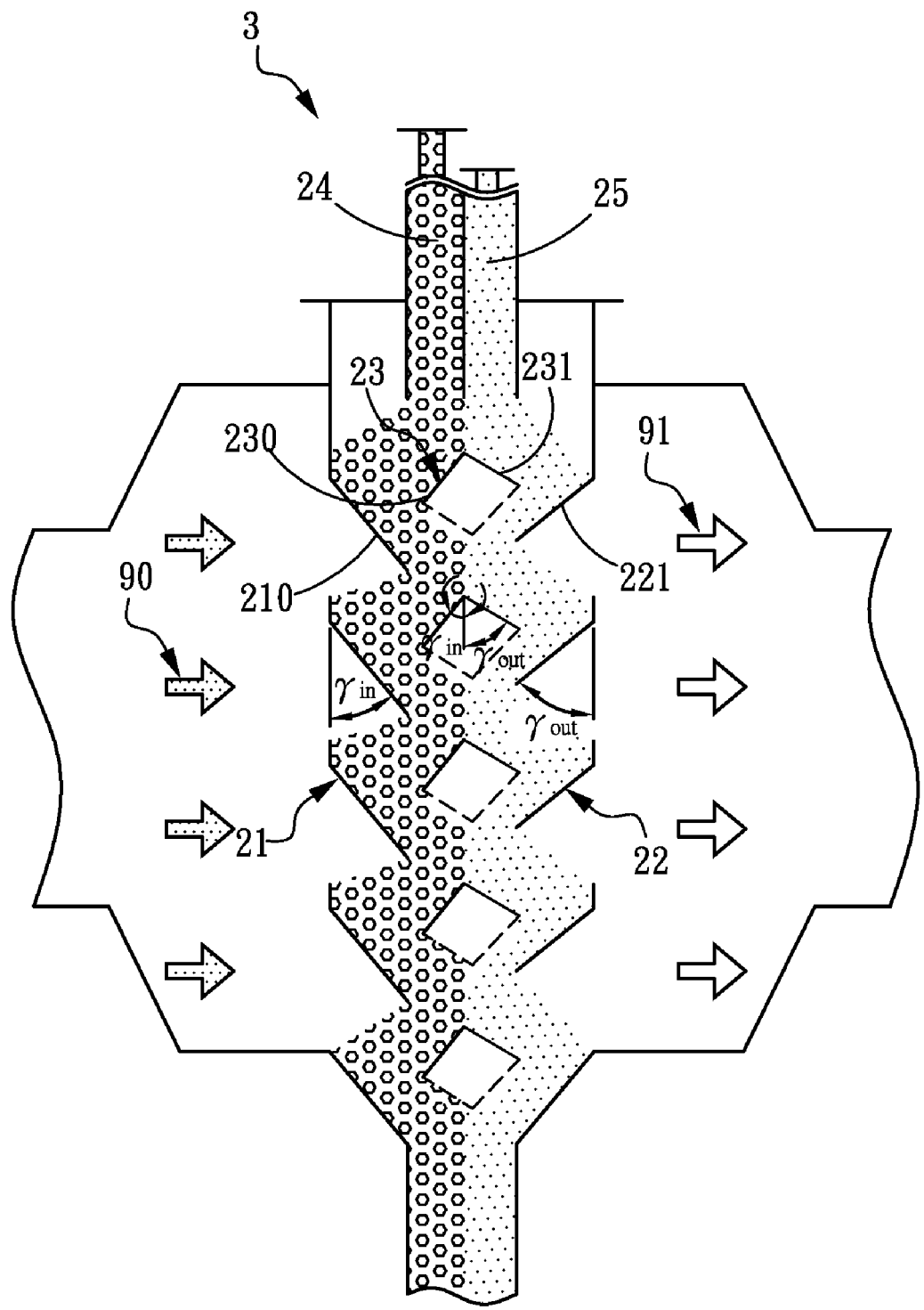
FIG. 6 is a schematic view of action of the moving bed apparatus formed by utilizing the embodiment of FIG. 3C of the present invention.

FIG. 5 is a schematic sectional view of a two-stage moving-bed apparatus according to a sixth embodiment of the present invention. Referring to FIG. 5, this embodiment is substantially similar to the structure of FIG. 3A, only except that the flow-corrective elements 23 of this embodiment are disposed between the second guide plate 2102 and the fourth guide plate 2212. FIG. 6 is a schematic view of action of the moving bed apparatus formed utilizing the embodiment of FIG. 3C of the present invention. Referring to FIG. 6, the exhaust gas flow 90 enters from the gas inlet part 21 of the filtering part, and flows through the granular moving-bed formed by the two different kinds of granular materials 24 and 25. In this embodiment, the first granular material 24 is a filter media, and the second granular material 25 is sorbent, and thus the dust particles in the exhaust gas flow 90 can be filtered out, and the contaminants in the exhaust gas flow can be adsorbed. Because the first granular material 24 and the second granular material 25 are in the state of mass flow, the first granular material 24 and the second granular material 25 will not cross-over, and no additional partition boards are needed.

The foregoing embodiments disclose that the two different, but neighbouring granular materials will not cross-over when flowing in the flow path without stagnant zones under a condition that the different granular materials flow through the flow path in a state of mass flow. The details of how to form a state of mass flow in the flow path may be obtained with reference to the document issued by Jenike's paper entitled "Gravity Flow of Solids" (Jenike, A. W., Trans. Instn Chem. Engrs, Vol. 40, pp. 264-271, 1962), in which it is taught how to determine the granular flow properties through shear testing and how to design hoppers for mass flow of granular materials in bins. Therefore, in order to design and carry on a sustainable mass flow of granular material 24 between the first louver wall 210 of the gas inlet part 21 and the first plate 230 of flow-corrective element 23, the measurements of flow properties of granular material 24 and design of corresponding angles $\gamma_{in}$ and dimensions of first guide plate 2101 and the first plate 230 of the flow-corrective element 23 should be accomplished according to Jenike's theory, as given below. Furthermore, in order to design and carry on a sustainable mass flow of granular material 25 between the second plate 231 of the flow corrective element 23 and the second louver wall 221 of the gas outlet part 22, the measurements of flow properties of granular material 25 and design of corresponding angles $\gamma_{out}$ and dimensions of second plate 231 of flow corrective element 23 and the third guide plate 2211 should be accomplished according to Jenike's theory, as given below.

Following flow properties of granular materials 24 and 25 should be measured and evaluated by means of shear testing for proper application of Jenike's theory of granular mass flow:

1. The effective angle of internal friction of the both granular materials and the appropriate mixture of granular material and dust particles from the exhaust gas flow must be known.

2. The flow functions of the both granular materials and the appropriate mixture of granular material and dust particles from the exhaust gas flow must be known.

3. The flow factors of the both granular materials and the appropriate mixture of granular material and dust particles from the exhaust gas flowing in a state of mass flow through two channels formed by the first louver wall and flow-corrective element and flow-corrective element and second louver wall must be known.

4. Angles of wall friction of the both granular materials and the appropriate mixture of granular material and dust particles from the exhaust gas must be known.

5. The bulk density of the granular materials and the appropriate mixture of granular material and dust particles from the exhaust gas must be known.

Under most circumstances, Jenike's paper entitled "Quantitative Design of Mass-Flow Bins" (Jenike, A. W., Powder Technology, Vol. 1, No. 4, pp. 237-244, 1967) has mentioned how the granular flow forms a state of mass flow in the channel through theory and experiment. Generally speaking, the angle $\gamma_{in}$ of the first louver wall 210 of the gas inlet part 21 and the first plate 230 of flow-corrective element 23 has to satisfy condition for mass flow of granular material 24. Furthermore, the angle $\gamma_{out}$ of the second plate 231 of the flow corrective element 23 and the second louver wall 221 of the gas outlet part 22 has to satisfy condition for mass flow of granular material 25.

Considering a different view of it, if angles $\gamma_{in}$ and $\gamma_{out}$ are not steep enough, the first granular material 24 and the second granular material 25 are unable to form a mass flow well, and if the mass flow is unable to be formed, the stagnant zones will be formed between the first granular material 24 and the first louver wall 210 and the first plate 230 of the flow-corrective element 23 and between the second granular material 25 and the second louver wall 221 and the second plate 231 of the flow-corrective element 23.

In the granular moving-bed apparatus of the present invention, in order that the granular flow forms a mass flow, what is important is determining the angles of the first louver walls 210, the second louver walls 221, and the flow-corrective elements 23 in the flow path, and evaluating the smallest width of the neck flow path formed between first louver walls 210 and second louver walls 221 and in the louver wall and the flow-corrective elements 23. The foregoing determination and evaluation are performed based on the radial stress field distribution of the neck flow path, i.e., when the stress of the granular flow is in direct proportion with the distance of a virtual apex of first louver wall 210 and second louver wall 221. Therefore, if only the flow properties of the granular materials 24 and 25, the angles of first louver wall 210, the second louver wall 221, and the two plates 230 and 231 of the flow-corrective element 23 can be known, the configuration making the granular material to form a mass flow can be estimated. This can be obtained through deduction by those skilled in the art according to the technique disclosed by Jenike.

Figure 7:
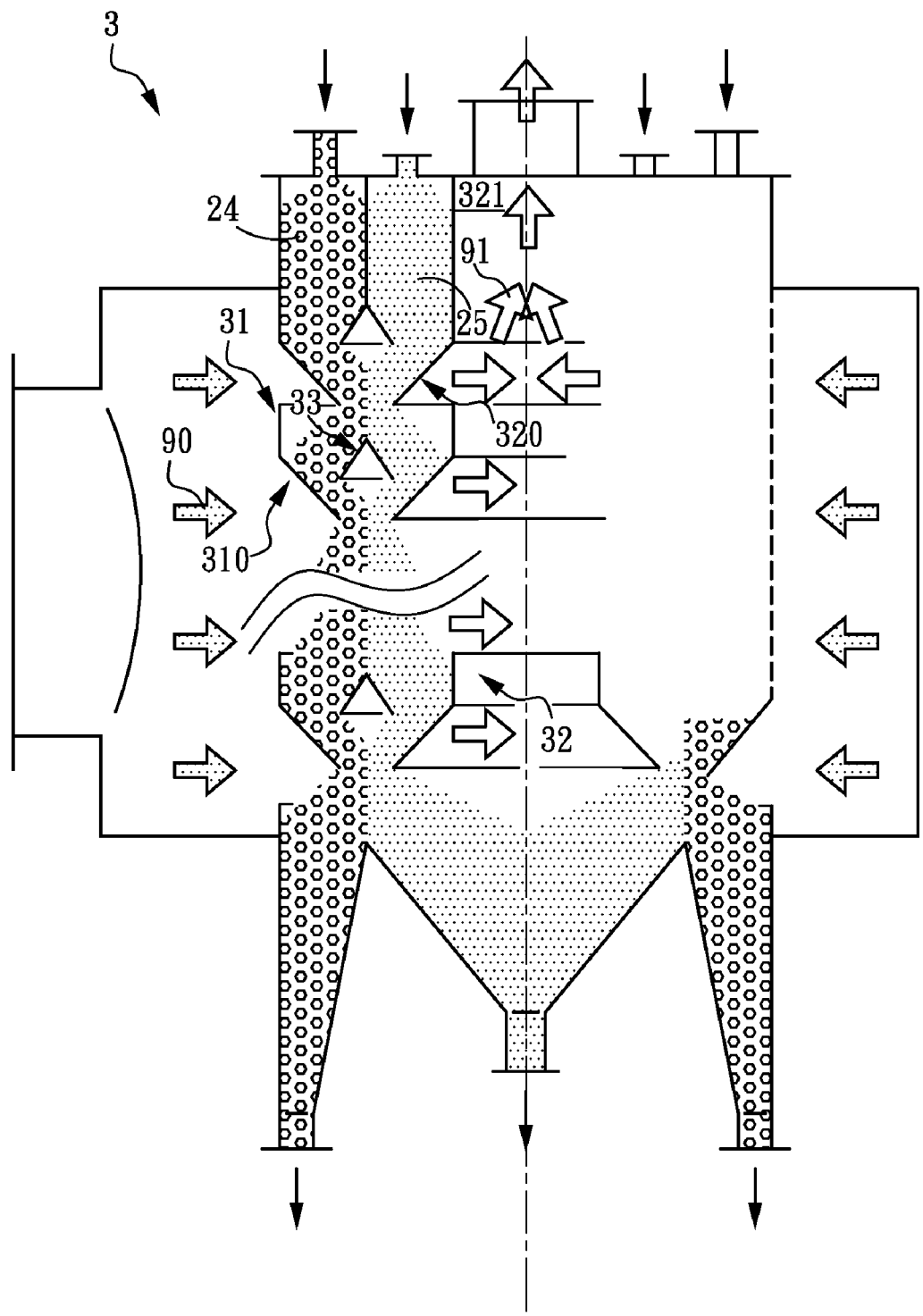
FIG. 7 is a schematic sectional view of a two-stage granular moving-bed apparatus according to a seventh embodiment of the present invention.

FIG. 7 is a schematic sectional view of a two-stage moving-bed apparatus according to a seventh embodiment of the present invention. Referring to FIG. 7, this embodiment is substantially an annular configuration, the exhaust gas flow enters from external of the apparatus, and the clean gas flow formed after filtration is drained from a center of the apparatus. The two-stage granular moving-bed apparatus 3 includes an annular gas inlet part 31, an annular gas outlet part 32, and a plurality of annular frustoconical flow-corrective elements 33. The annular gas inlet part 31 has a plurality of first annular frustoconical downwardly orientated louver walls 310, for the exhaust gas flow 90 to enter the filter. The annular gas outlet part 32 forms internal boundary of annular moving bed and has a plurality of second annular frustoconical upwardly orientated louver walls 320 corresponding to the plurality of first annular frustoconical downwardly orientated louver walls 310 respectively. A flow path 321 exists within the annular gas outlet part 32, for the clean gas flow 91 to leave the filter. The plurality of annular frustoconical flow-corrective elements 33 is disposed between the annular frustoconical downwardly orientated gas inlet part 31 and the annular frustoconical upwardly orientated gas outlet part 32, and each annular frustoconical flow-corrective element 33 is corresponding to the first annular frustoconical downwardly orientated louver wall 310 and the second annular frustoconical upwardly orientated louver wall 320. The first granular material 24 flows through the flow path formed between the annular gas inlet part 31 and the annular frustoconical flow-corrective element 33 in a state of mass flow. The second granular material 25 flows through the flow path formed between the annular gas outlet part 32 and the annular frustoconical flow-corrective element 33 in a state of mass flow. The combination of the first annular frustoconical downwardly orientated louver wall 310, the second annular frustoconical upwardly orientated louver wall 320, and the annular frustoconical flow-corrective element 33 is shown in FIGS. 3A to 3D and 4A to 4D, and is not repeated herein. louver wall 320, and the annular frustoconical flow-corrective element 33 is shown in FIGS. 3A to 3D and 4A to 4D, and is not repeated herein.

Figure 8:
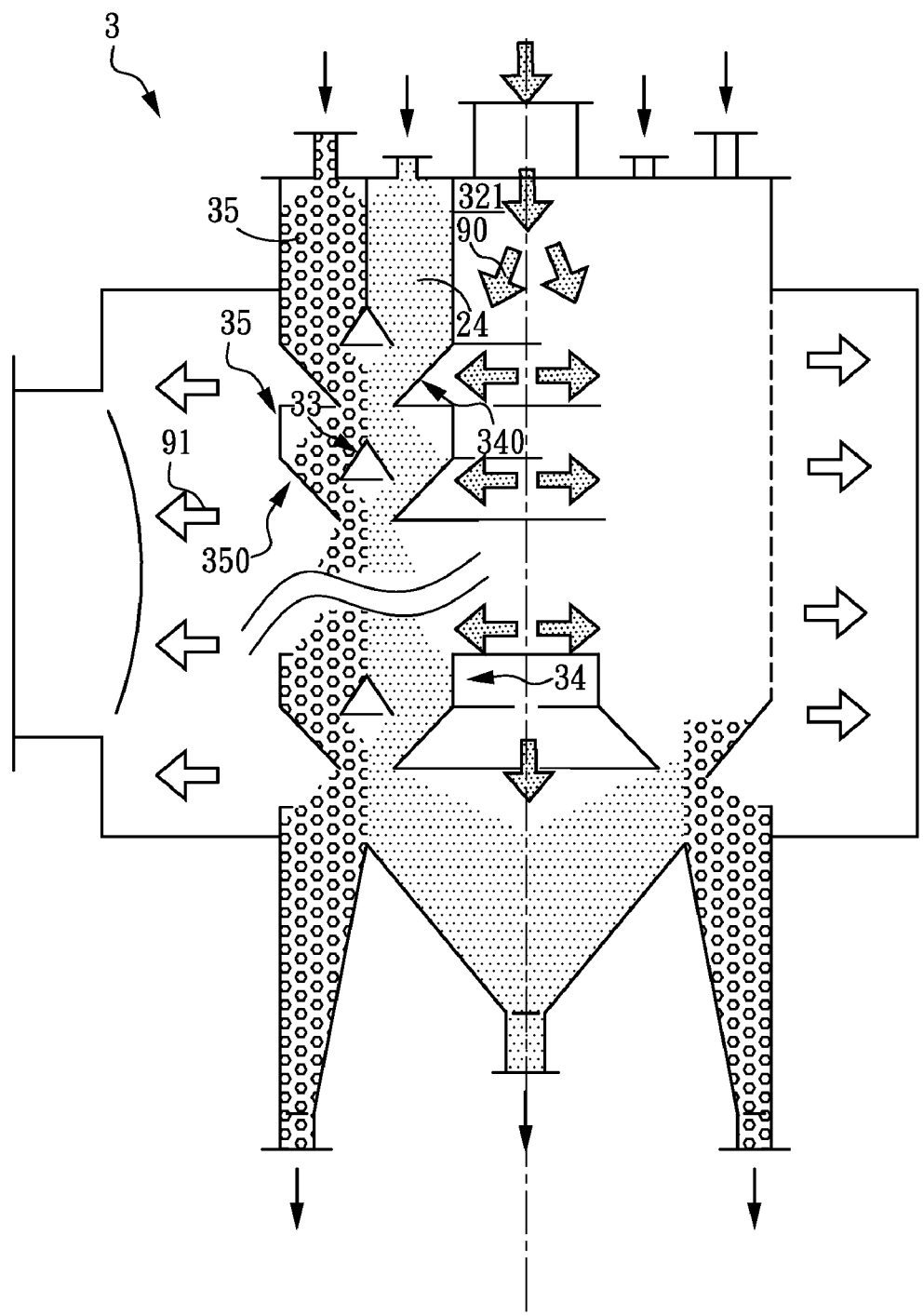
FIG. 8 is a schematic view sectional of a two-stage granular moving-bed apparatus according to an eighth embodiment of the present invention.

FIG. 8 is a schematic sectional view of a two-stage granular moving-bed apparatus according to an eighth embodiment of the present invention. Referring to FIG. 8, this embodiment is substantially the same as the embodiment shown in FIG. 7, only except that this embodiment exchanges the annular gas inlet part with the annular gas outlet part of FIG. 7, i.e., the exhaust gas flow 90 of this embodiment enters the flow path 321 of the apparatus, then enters the first annular frustoconical upwardly orientated louver wall 340 of the annular gas inlet part 34, forms the clean gas flow 91 after the filtration through the first granular material 24 and the second granular material 25, then exits the second annular frustoconical downwardly orientated louver wall 350 of the annular gas outlet part 35.

Figure 9A:
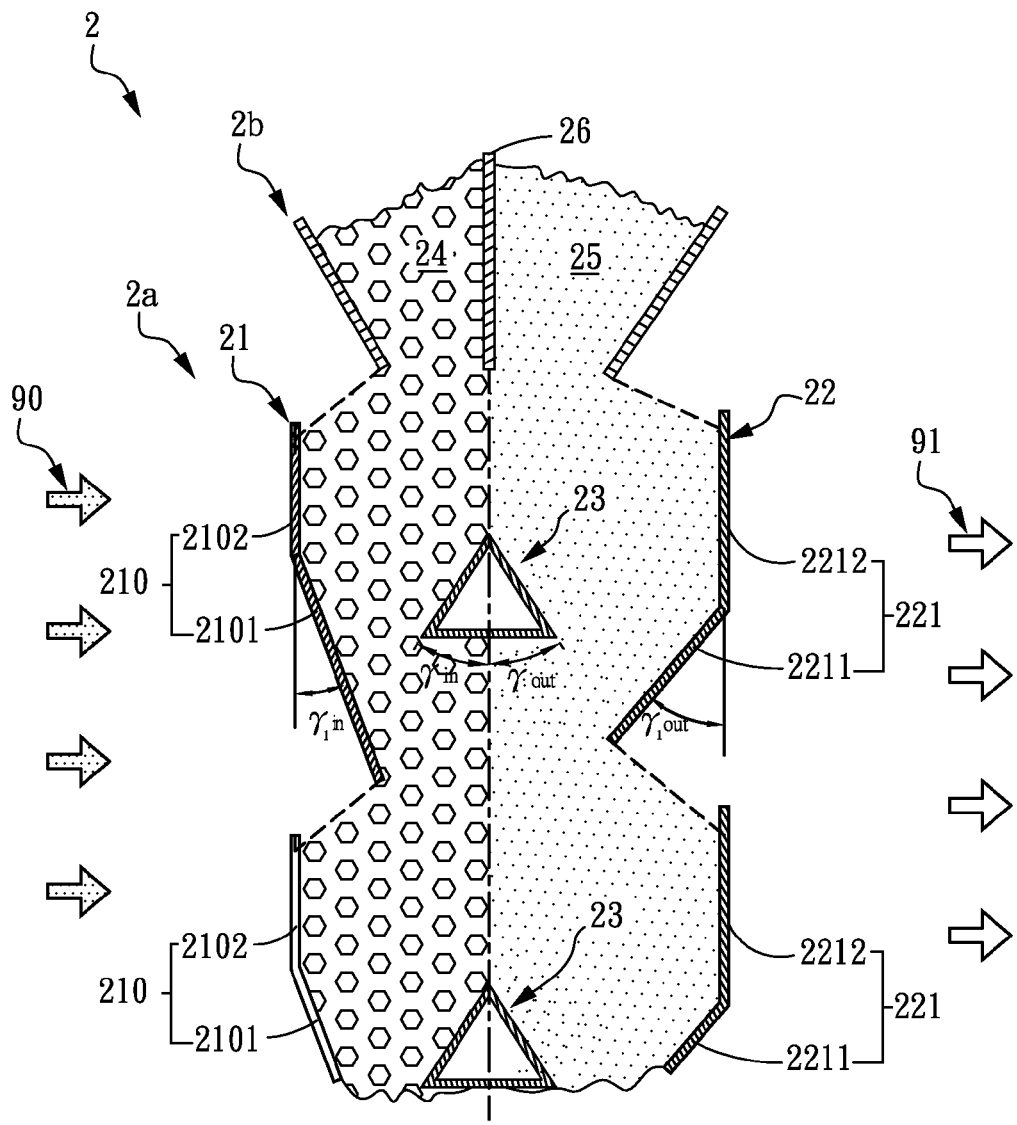
FIG. 9A to FIG. 9D respectively illustrate various types of flow-corrective element of the two-stage granular moving-bed apparatus of the present invention
Figure 9B:
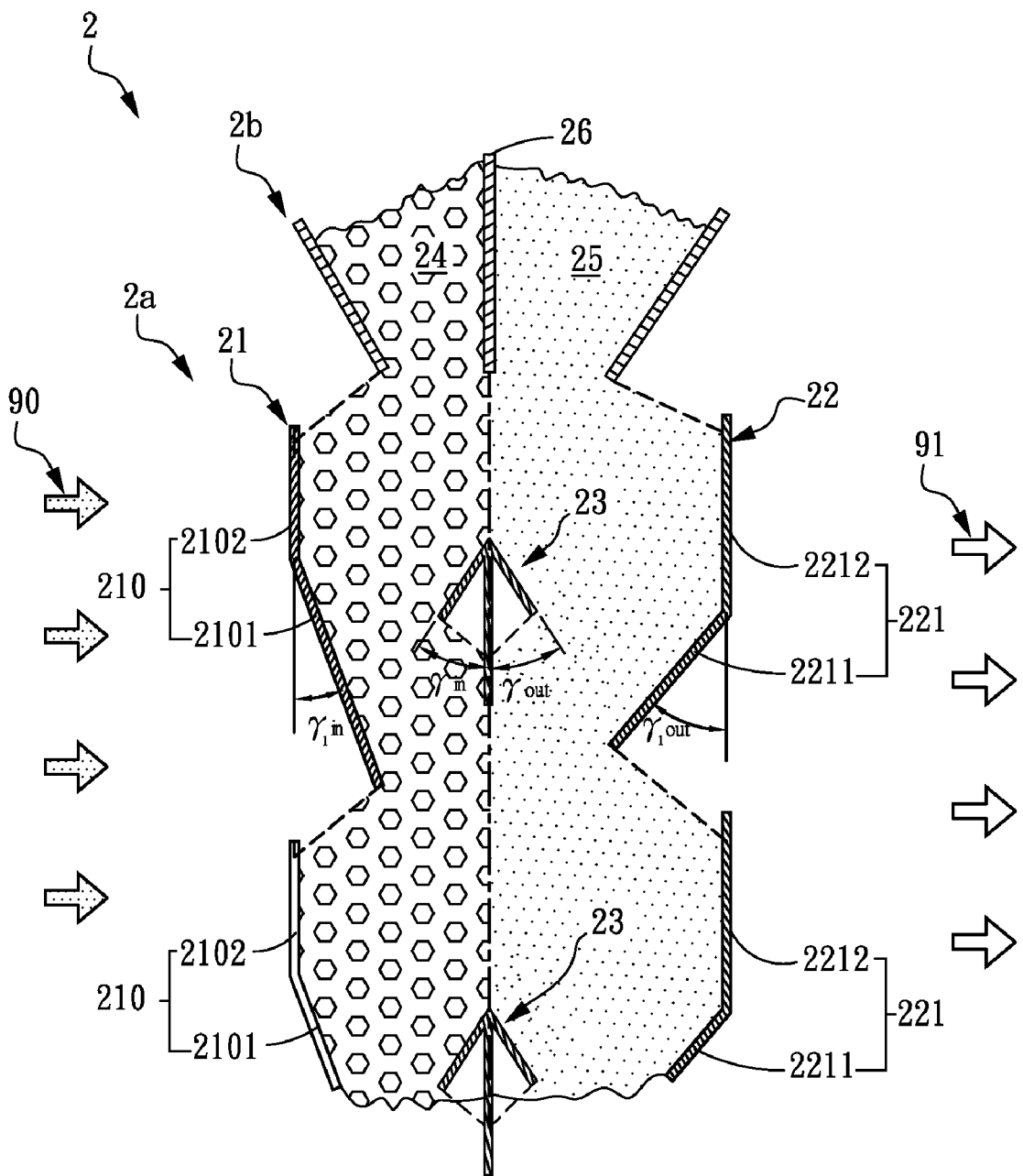
Figure 9C:
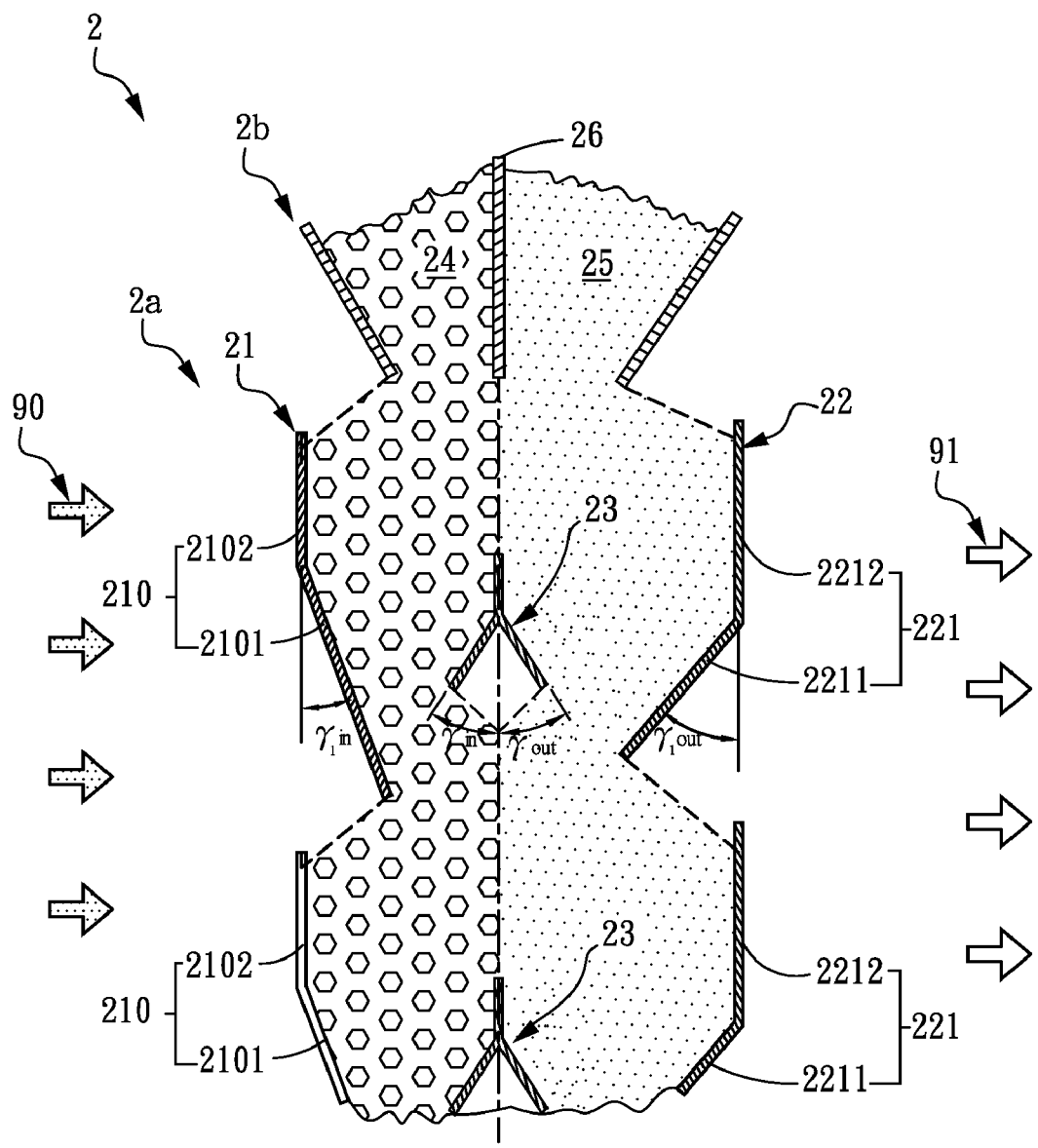
Figure 9D:
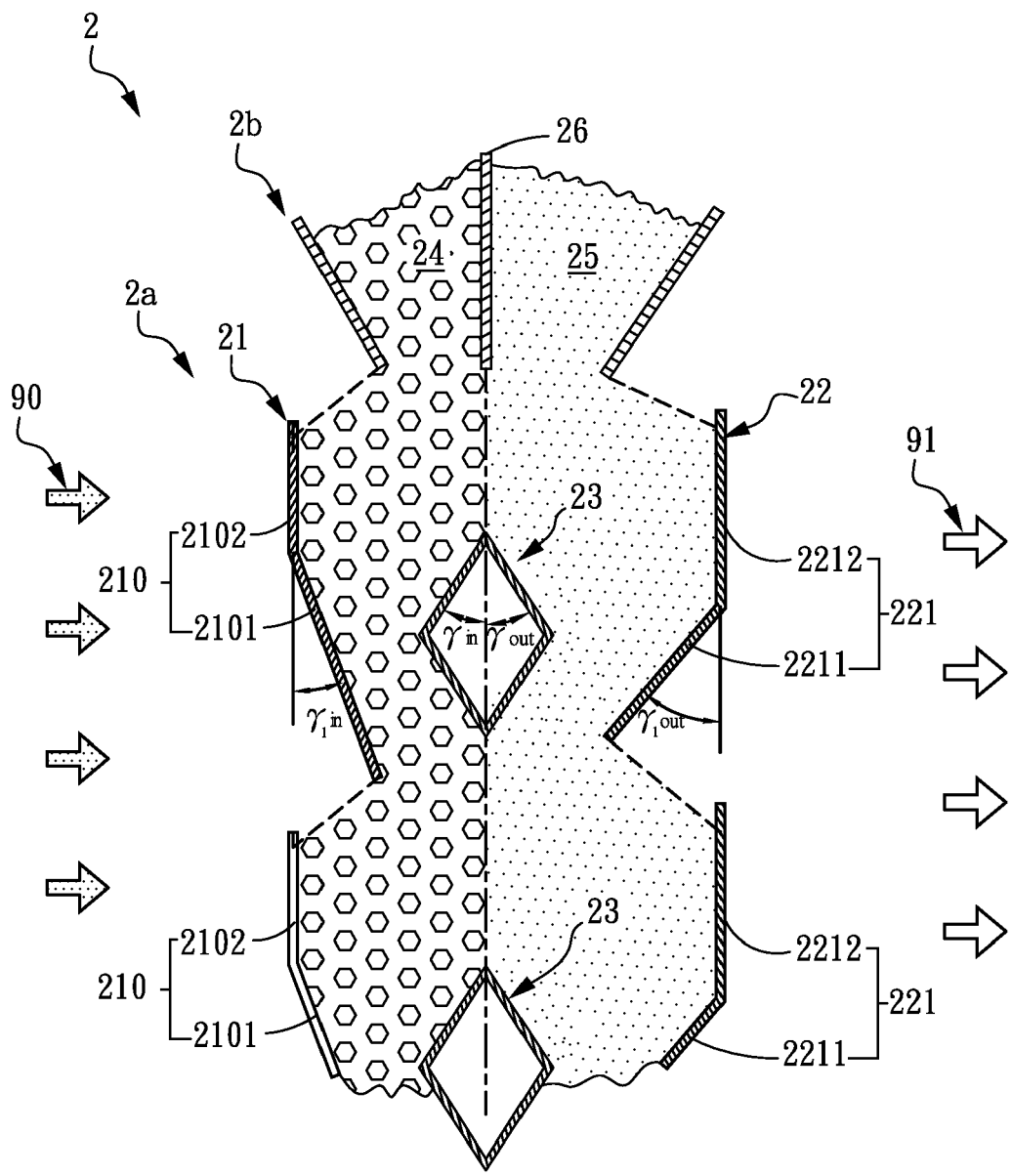

Please refer to FIG. 9A to FIG. 9D, which illustrate various types of flow-corrective element of the two-stage granular moving-bed apparatus of the present invention. In FIG. 9A, the flow-corrective element 23 has a triangle structure. In the FIG. 9B, the flow-corrective element 23 has an arrow structure. In the FIG. 9C, the flow-corrective element 23 has an inverse Y structure, while the flow-corrective element 23 in FIG. 9D has a diamond shape structure.

It will be apparent to those skilled in the art that various modifications and variations can be made to the structure of the present invention without departing from the scope or spirit of the present invention. Therefore, the content of the specification of the present invention shall not be considered as restricting the present invention.

Accordingly, the two-stage granular moving-bed apparatus provided by the present invention can filter out the contaminants in the gas by flowing through two different kinds of filter media, so as to enhance the efficiency of filtering and adsorbing the dust particles and contaminants in the exhaust gas flow. Therefore, the present invention can increase the competitiveness of this industry and drive the development of related industries, and is provided with the element needed to apply an invention specified by the patent law, the application of the patent is presented by law, and we wish the review committee to spare time to review and grant patent.

What is claimed is:

1. A two-stage granular moving-bed apparatus, comprising:
   a filtering part, comprising:
      a gas inlet part, having a plurality of first louver walls, for an exhaust gas flow to enter the filtering part; a gas outlet part, disposed at one side of the gas inlet part, and having a plurality of second louver walls corresponding to the plurality of first louver walls, for a clean gas to flow out; and a plurality of flow-corrective elements, disposed between the gas inlet part and the gas outlet part, and each corresponding to the first louver wall and the second louver wall, each flow-corrective element further having a first plate and a second plate, a first angle formed between the first plate and the vertical plane, a second angle formed between the second plate and the vertical plane respectively, and one end of the second plate connected to the body of the first plate;
   a filter media supplying part, disposed above the filtering part, and having a partition board therein so as to form two accommodation spaces within the filter media supplying part;
   a first granular material, accommodated within the first accommodation space, and flowing through a channel between the flow-corrective element and the first louver wall in a state of mass flow under the gravity, wherein the first angle formed between the first plate and the vertical plane is depending on flow properties of the first granular material; and
   a second granular material, accommodated within the second accommodation space, and flowing through a channel between the flow-corrective element and the second louver wall in a state of mass flow under the gravity, wherein the second angle formed between the second plate and the vertical plane is depending on flow properties of the second granular material;
   wherein the first granular material is a coarse filter media, the second granular material is a fine filter media, and the exhaust gas flows into the first granular material then into the second granular material to remove contaminants and to form the clean gas.

2. The two-stage granular moving-bed apparatus according to claim 1, wherein the first louver wall and the second louver wall are configured with inclined guide plate.

3. The two-stage granular moving-bed apparatus according to claim 1, wherein the first louver wall and the second louver wall are configured with both, vertical and inclined guide plates.

4. The two-stage granular moving-bed apparatus according to claim 1, further comprises:
   A first neck flow path between the first plate and the first louver wall for the first granular material to flow therethrough; and
   a second neck flow path between the second plate and the second louver wall for the second granular material to flow therethrough.

5. The two-stage granular moving-bed apparatus according to claim 1, wherein the first granular material is a coarse filter media.

6. The two-stage granular moving-bed apparatus according to claim 5, wherein the second granular material is a fine filter media.

7. The two-stage granular moving-bed apparatus according to claim 1, wherein the first granular material is a filter media.

8. The two-stage granular moving-bed apparatus according to claim 7, wherein the second granular material is an adsorbing material.

9. The two-stage granular moving-bed apparatus according to claim 1, wherein the first granular material and the second granular material are selected as silica sand, activated carbon, adsorbent, catalyst and other particulates.

10. The two-stage granular moving-bed apparatus according to claim 1, wherein the first louver wall further has a first guide plate and a second guide plate, and an angle is formed between the second guide plate and the first guide plate.

11. The two-stage granular moving-bed apparatus according to claim 1, wherein the second louver wall further has a third guide plate and a fourth guide plate, and an angle is formed between the third guide plate and the fourth guide plate.

12. The two-stage granular moving-bed apparatus according to claim 1, wherein the structure of the flow-corrective element is selected from a group consisting of triangle, arrow, inverse Y, and diamond.

13. The two-stage granular moving-bed apparatus according to claim 1, wherein the first louver walls have a first length, the second louver walls have a second length, and the first length is different from the second length.

14. The two-stage granular moving-bed apparatus according to claim 1, wherein a first neck flow path is formed between the first louver walls and the flow-corrective elements, a second neck flow path is formed between the second louver walls and the flow-corrective elements, and the first neck flow path has a different size than the second neck flow path.

15. A two-stage granular moving-bed apparatus, comprising:
   a filtering part, comprising:
      an annular gas inlet part, having a plurality of first annular frustoconical downwardly orientated louver walls, for an exhaust gas flow to enter the filtering part;
      an annular gas outlet part, disposed within the annular gas inlet part so as to form internal boundary of the moving bed, and having a plurality of second annular frustoconical upwardly orientated louver walls corresponding to the plurality of first annular frustoconical downwardly orientated louver walls respectively, for a clean gas flow to leave the filter; and
      a plurality of annular frustoconical flow-corrective elements, disposed between the annular gas inlet part and the annular gas outlet part, and each corresponding to the first annular frustoconical downwardly orientated louver wall and the second annular frustoconical upwardly orientated louver wall, a first angle formed between the first annular frustoconical downwardly orientated louver wall and the vertical plane, a second angle formed between the second annular frustoconical upwardly orientated louver wall plate and the vertical plane; and
   a granular material supplying part, disposed above the filtering part, and divided into a first annular accommodation space and a second annular accommodation space by a cylindrical partition board;
   a first granular material, accommodated within the first annular accommodation space, and flowing through an annular channel between the annular frustoconical flow-corrective element and the first annular frustoconical downwardly orientated louver wall in a state of mass flow, the first angel formed between the first annular frustoconical downwardly orientated louver wall and the vertical plane depending on the flow properties of the first granular material; and a second granular material, accommodated within the second annular accommodation space, and flowing through an annular channel between the annular frustoconical flow-corrective element and the second annular frustoconical upwardly orientated louver wall in a state of mass flow, the second angle formed between the second annular frustoconical upwardly orientated louver wall and the vertical plane depending on flow properties of the second granular material;

wherein the first granular material is a coarse filter media, the second granular material is a fine filter media, and the exhaust gas flows into the first granular material then into the second granular material to remove contaminants and to form the clean gas.

16. The two-stage granular moving-bed apparatus according to claim 15, wherein the first annular frustoconical downwardly orientated louver wall and the second annular frustoconical upwardly orientated louver wall are configured with frustum.

17. The two-stage granular moving-bed apparatus according to claim 15, wherein the first annular frustoconical downwardly orientated louver wall and the second annular frustoconical upwardly orientated louver wall are configured with both frustum and cylinder.

18. The two-stage granular moving-bed apparatus according to claim 15, wherein the annular frustoconical flow-corrective element has a first frustum and a second frustum, a neck flow path for the first granular material to flow therethrough is formed between the first frustum and the first annular frustoconical downwardly orientated louver wall, and a neck flow path for the second granular material to flow therethrough is formed between the second frustum and the second annular frustoconical upwardly orientated louver wall.

19. The two-stage granular moving-bed apparatus according to claim 15, wherein the first granular material is a coarse filter media.

20. The two-stage granular moving-bed apparatus according to claim 19, wherein the second granular material is a fine filter media.

21. The two-stage granular moving-bed apparatus according to claim 15, wherein the first granular material is a filter media.

22. The two-stage granular moving-bed apparatus according to claim 21, wherein the second granular material is an adsorbing material.

23. The two-stage granular moving-bed apparatus according to claim 15, wherein the first granular material and the second granular material are selected as silica sand, activated carbon, or adsorbent respectively.

24. The two-stage granular moving-bed apparatus according to claim 15, wherein the first annular frustoconical downwardly orientated louver wall further has a first guide frustum and a second guide cylinder, and an angle is formed between the second guide cylinder and the first guide frustum.

25. The two-stage granular moving-bed apparatus according to claim 15, wherein the second annular frustoconical upwardly orientated louver wall further has a third guide frustum and a fourth guide cylinder, and an angle is formed between the third guide frustum and the fourth guide cylinder.

26. The two-stage granular moving-bed apparatus according to claim 15, wherein the structure of the flow-corrective element is selected from a group consisting of triangle, arrow, inverse Y, and diamond.

27. A two-stage granular moving-bed apparatus, comprising:

a filtering part, comprising:
an annular gas inlet part, having a plurality of first annular frustoconical upwardly orientated louver walls, for an exhaust gas flow to enter the filtering part;
an annular gas outlet part, forming the outer boundary of annular moving bed, and having a plurality of second annular frustoconical downwardly orientated louver walls corresponding to the plurality of first annular frustoconical upwardly orientated louver walls, for a clean gas flow to leave the filter; and
a plurality of annular frustoconical flow-corrective elements, disposed between the annular gas inlet part and the annular gas outlet part, and each corresponding to the first annular frustoconical upwardly orientated louver wall and the second annular frustoconical downwardly orientated louver wall, a first angle formed between the first annular frustoconical upwardly orientated louver wall and the vertical plane, and a second angle formed between the second annular frustoconical downwardly orientated louver wall and the vertical plane; and a granular material supplying part, disposed above the filtering part, and divided into a first annular accommodation space and a second annular accommodation space by a cylindrical partition board;

a first granular material, accommodated within the first annular accommodation space, and flowing through an annular channel between the annular frustoconical flow-corrective element and the first annular frustoconical upwardly orientated louver wall in a state of mass flow, the first angle formed between the first annular frustoconical upwardly orientated louver wall and the vertical plane depending on flow properties of the first granular material; and a second granular material, accommodated within the second annular accommodation space, and flowing through an annular channel between the annular frustoconical flow-corrective element and the second annular frustoconical downwardly orientated louver wall in a state of mass flow, the second angle formed between the second annular frustoconical downwardly orientated louver wall and the vertical plane depending on flow properties of the second granular material;

wherein the first granular material is a coarse filter media, the second granular material is a fine filter media, and the exhaust gas flows into the first granular material then into the second granular material to remove contaminants and to form the clean gas.

* * * * *